US012675541B2

(12) United States Patent 　　　　　　(10) Patent No.:　US 12,675,541 B2
Furuta et al. 　　　　　　　　　　　　(45) Date of Patent:　　　Jul. 7, 2026

(54) MULTIMODAL WEB NAVIGATION

(71) Applicant: Google LLC, Mountain View, CA (US)

(72) Inventors: Hiroki Furuta, Tokyo (JP); Ofir Nachum, San Francisco, CA (US); Kuang-Huei Lee, San Francisco, CA (US); Izzeddin Gur, San Jose, CA (US); Shixiang Gu, San Francisco, CA (US)

(73) Assignee: Google LLC, Mountain View, CA (US)

( * ) Notice: Subject to any disclaimer, the term of this patent is extended or adjusted under 35 U.S.C. 154(b) by 268 days.

(21) Appl. No.: 18/584,580

(22) Filed: Feb. 22, 2024

(65) Prior Publication Data

US 2025/0272350 A1　　Aug. 28, 2025

(51) Int. Cl.
　　*G06F 16/954*　　(2019.01)
　　*G06F 40/284*　　(2020.01)
　　*G06V 30/413*　　(2022.01)
(52) U.S. Cl.
　　CPC .......... *G06F 16/954* (2019.01); *G06F 40/284* (2020.01); *G06V 30/413* (2022.01)
(58) Field of Classification Search
　　CPC .... G06F 16/954; G06F 40/284; G06V 30/413
　　See application file for complete search history.

(56) References Cited

U.S. PATENT DOCUMENTS

| 11,734,375 B2 * | 8/2023 | Faust | ..................... G06N 3/045 |
| | | | 707/736 |
| 2023/0178076 A1 * | 6/2023 | Abramson | .............. G10L 15/16 |
| | | | 704/232 |
| 2025/0094713 A1 * | 3/2025 | Wang | ................... G06F 40/284 |

OTHER PUBLICATIONS

WebVoyager : Building an End-to-End Web Agent with Large Multimodal Models; Hongliang He et al. Jun. 6, 2024 (Year: 2024).*
Px2Struct (Year: 2023).*
Li et al., "SelfDoc: Self-Supervised Document Representation Learning", Jun. 7, 2021.
Li et al., "Pre-Trained Language Models for Interactive Decision-Making", Oct. 29, 2022.
Li et al., "Mapping Natural Language Instructions to Mobile UI Action Sequences", Jun. 5, 2020.
Li et al., "Competition-Level Code Generation with AlphaCode", Feb. 8, 2022.

(Continued)

*Primary Examiner* — Cao H Nguyen
(74) *Attorney, Agent, or Firm* — McDonnell Boehnen Hulbert & Berghoff LLP

(57) ABSTRACT

Machine learning models for autonomously navigating the web and/or apps are provided that receive (i) visual input that includes one or more images representing the current, and optionally one or more prior, visual states of the website or app being navigated, and (ii) textual input that represents a user request to be implemented by the model, the current HTML or other code defining the website or app, and optionally additional text like prior model outputs that represent prior steps in the navigation of the website or app by the model. The visual input and textual input are transformed into respective sets of visual and textual tokens, and this multi-modal token set is applied to an encoder. The output of the encoder is applied to a decoder to generate textual output that represents an action to take, relative to the code defining the website or app, to pursue the user request.

20 Claims, 11 Drawing Sheets

Instruction: Find Gisele's email and forward it to Siana, please.

(56) References Cited

OTHER PUBLICATIONS

Liu et al., "Reinforcement Learning on Web Interfaces Using Workflow-Guided Exploration", Feb. 24, 2018.

Lu et al., "Unified-IO: A Unified Model for Vision, Language, and Multi-Modal Tasks", Oct. 4, 2022.

Matsushima et al., "Deployment-Efficient Reinforcement Learning via Model-Based Offline Optimization", Jun. 23, 2020.

Mazumder et al., "FLIN: A Flexible Natural Language Interface for Web Navigation" Apr. 13, 2021.

Meta Fundamental AI Research Diplomacy Team (FAIR), Bakhtin et al., "Human-level play in the game of Diplomacy by combining language models with strategic reasoning", Science 378, 1067-1074, Dec. 9, 2022.

Nakano et al., "WebGPT: Browser-assisted question-answering with human feedback", Jun. 1, 2022.

Nogueira et al., "End-to-End Goal-Driven Web Navigation", May 20, 2016.

Quyang et al., "Training language models to follow instructions with human feedback", Mar. 4, 2022.

Radford et al., "Language Models are Unsupervised Multitask Learners", 24 pages.

Radford et al., "Learning Transferable Visual Models From Natural Language Supervision", Feb. 26, 2021.

Rae et al., "Scaling Language Models: Methods, Analysis & Insights from Training Gopher", DeepMind, Jan. 21, 2022.

Raffel et al., "Exploring the Limits of Transfer Learning with a Unified Text-to-Text Transformer", Journal of Machine Learning Research 21, Sep. 19, 2023.

Reed et al., "A Generalist Agent", Transactions on Machine Learning Research, Nov. 11, 2022.

Roberts et al., "Scaling Up Models and Data with t5x and seqio", Mar. 31, 2022.

Shah et al., "LM-Nav: Robotic Navigation with Large Pre-Trained Models of Language, Vision, and Action", Jul. 26, 2022.

Shi et al., "World of Bits: An Open-Domain Platform for Web-Based Agents", 2017.

Shoeybi et al., "Megatron-LM: Training Multi-Billion Parameter Language Models Using Model Parallelism", Mar. 13, 2020.

Shridhar et al. "Perceiver-Actor: A Multi-Task Transformer for Robotic Manipulation", Nov. 11, 2022.

Shvo et al., "AppBuddy: Learning to Accomplish Tasks in Mobile Apps via Reinforcement Learning", Jun. 6, 2021.

Stiennon et al., "Learning to summarize from human feedback", Feb. 15, 2022.

Tang et al., "Unifying Vision, Text, and Layout for Universal Document Processing", Mar. 13, 2023.

Tran et al., "UL2: Unifying Language Learning Paradigms", Feb. 28, 2023.

Toyama et al., "AndroidEnv: A Reinforcement Learning Platform for Android", May 27, 2021.

Vaswani et al., "Attention Is All You Need", Aug. 2, 2023.

Wang et al., "Neural Codec Language Models are Zero-Shot Text to Speech Synthesizers", Jan. 5, 2023.

Wang et al., "LiLT: A Simple yet Effective Language-Independent Layout Transformer for Structured Document Understanding", Feb. 28, 2022.

Wang et al., "WebFormer: The Web-page Transformer for Structure Information Extraction", Feb. 1, 2022.

Wei et al., "Finetuned Language Models are Zero-Shot Learners", Feb. 8, 2022.

Wei et al., "Emergent Abilities of Large Language Models", Oct. 26, 2022.

Wei et al., "Chain-of-Thought Prompting Elicits Reasoning in Large Language Models", Jan. 10, 2023.

Xu et al., "LayoutLM: Pre-training of Text and Layout for Document Image Understanding", Jun. 16, 2020.

Yao et al., "WebShop: Towards Scalable Real-World Web Interaction with Grounded Language Agents", Feb. 8, 2023.

Yao et al., "React: Synergizing Reasoning and Acting in Language Models", Mar. 10, 2023.

Zaheer et al., "Learning to Navigate Wikipedia by Taking Random Walks", Oct. 31, 2022.

Zeng et al., "Socratic Models: Composing Zero-Shot Multimodal Reasoning with Language", May 27, 2022.

Ziegler et al., "Fine-Tuning Language Models from Human Preferences", Jan. 8, 2020.

Adolphs et al., "Boosting Search Engines with Interactive Agents", Transactions on Machine Learning Research, Jun. 7, 2022.

Aghajanyan et al., "HTLM: Hyper-Text Pre-Training and Prompting of Language Models", Jul. 14, 2021.

Aghajanyan et al., "CM3: A Causal Masked Multimodal Model of the Internet", Jan. 19, 2022.

Ahn et al., "Do as I Can, Not as I Say: Grounding Language in Robotic Affordances", Aug. 16, 2022.

Alayrac et al., "Flamingo: a Visual Language Model for Few-Shot Learning", Nov. 15, 2022.

Appalaraju et al., "Docformer: End-to-End Transformer for Document Understanding", International Conference on Computer Vision, Sep. 20, 2021.

Austin et al., "Program Synthesis with Large Language Models", Aug. 16, 2021.

Bommasani et al., "On the Opportunities and Risks of Foundation Models", Jul. 12, 2022.

Brohan et al., "RT-1: Robotics Transformer for Real-World Control at Scale", Aug. 11, 2023.

Brown et al., "Language Models are Few-Shot Learners", Jul. 22, 2020.

Burns et al., "A Dataset for Interactive Vision-Language Navigation with Unknown Command Feasibility", Aug. 15, 2022.

Chen et al., "Decision Transformer: Reinforcement Learning via Sequence Modeling", Jun. 24, 2021.

Chen et al., "Evaluating Large Language Models Trained on Code", Jul. 14, 2021.

Chen et al., "A System for General In-Hand Object Re-Orientation", 5th Conference on Robot Learning, Nov. 4, 2021.

Chen et al., "PaLI: A Jointly-Scaled Multilingual Language-Image Model", Jun. 5, 2023.

Chowdhery et al., "PaLM: Scaling Language Modeling with Pathways", Oct. 5, 2022.

Chung et al., "Scaling Instruction-Finetuned Language Models", Dec. 6, 2022.

Interactive Agents Team, "Creating Multimodal Interactive Agents with Imitation and Self-Supervised Learning", DeepMind, Feb. 2, 2022.

Deng et al., "ImageNet: A Large-Scale Hierarchical Image Database".

Devlin et al., "BERT: Pre-training of Deep Bidirectional Transformers for Language Understanding", May 24, 2019.

Diaz et al., "User-Driven Automation of Web Form Filling", ICWE 2013, pp. 171-185.

Dosovitskiy et al., "An Image is Worth 16X16 Words: Transformers for Image Recognition at Scale", Jun. 3, 2021.

Fan et al., "MINEDOJO: Building Open-Ended Embodied Agents with Internet-Scale Knowledge", Nov. 22, 2022.

Furuta et al., "A System for Morphology-Task Generalization via Unified Representation and Behavior Distillation", Feb. 4, 2023.

Furuta et al., "Generalized Decision Transformer for Offline Hindsight Information Matching", Feb. 4, 2022.

Ghosh et al., "Learning to Reach Goals via Iterated Supervised Learning", Oct. 2, 2020.

Gu et al., "BRAXLINES: Fast and Interactive Toolkit for RL-driven Behavior Engineering beyond Reward Maximization", Oct. 10, 2021.

Gu et al., "Open-Vocabulary Object Detection via Vision and Language Knowledge Distillation", May 12, 2022.

Gur et al., "Learning to Navigate the Web", Dec. 21, 2018.

Gur et al., "Environment Generation for Zero-Shot Compositional Reinforcement Learning", Jan. 21, 2022.

Gur et al., "Understanding HTML with Large Language Models", May 19, 2023.

(56) References Cited

OTHER PUBLICATIONS

He et al., "Deep Residual Learning for Image Recognition", Dec. 10, 2015.

He et al., "ActionBert: Leveraging User Actions for Semantic Understanding of User Interfaces", Jan. 25, 2021.

Huang et al., "Language Models as Zero-Shot Planners: Extracting Actionable Knowledge for Embodied Agents", Mar. 8, 2022.

Huang et al., "Inner Monologue: Embodied Reasoning through Planning with Language Models", Jul. 12, 2022.

Humphreys et al., "A Data-Driven Approach for Learning to Control Computers", Nov. 11, 2022.

Iyer et al., "OPT-IML: Scaling Language Model Instruction Meta Learning through the Lens of Generalization", Jan. 30, 2023.

Janner et al., "Offline Reinforcement Learning as One Big Sequence Modeling Problem", Nov. 29, 2021.

Jaques et al., "Way Off-Policy Batch Deep Reinforcement Learning of Implicit Human Preferences in Dialog", Jul. 8, 2019.

Jia et al., "DOM-Q-NET: Grounded RL on Structured Language", Feb. 19, 2019.

Jiang et al., "VIMA: General Robot Manipulation with Multimodal Prompts", May 28, 2023.

Kamath et al., "MDETR—Modulated Detection for End-to-End Multi-Modal Understanding", Oct. 12, 2021.

Kaplan et al., "Scaling Laws for Neural Language Models", Jan. 23, 2020.

Kojima et al., "Large Language Models are Zero-Shot Reasoners", Jan. 29, 2023.

Kudo et al., "SentencePiece: A simple and language independent subword tokenizer and detokenizer for Neural Text Processing", Aug. 19, 2018.

Lee et al., "Pix2Struct: Screenshot Parsing as Pretraining for Visual Language Understanding", Jun. 15, 2023.

Lee et al., "Multi-Game Decision Transformers", Oct. 15, 2022.

Lewis et al., "BART: Denoising Sequence-to-Sequence Pre-training for Natural Language Generation, Translation, and Comprehension", Oct. 29, 2019.

Li et al., "StructuralLM: Structural Pre-training for Form Understanding", May 24, 2021.

Li et al., "MarkupLM: Pre-training of Text and Markup Language for Visually Rich Document Understanding", Mar. 11, 2022.

* cited by examiner

*Instruction: Find Gisele's email and forward it to Siana, please.*

| Methods | Modality | Success Rate |
|---|---|---|
| WebGUM | HTML | 75.5% |
| WebGUM (white) | HTML+Image | 76.6% |
| WebGUM (random) | HTML+Image | 78.5% |
| WebGUM | HTML+Image | 80.3% |
| WebGUM (single, $H = 2$) | HTML+Image | 64.2% |
| WebGUM (multiple, $H = 1$) | HTML+Image | 64.0% |
| WebGUM (multiple, $H = 2$) | HTML+Image | 66.1% |

| Methods | Modality | Success Rate |
|---|---|---|
| WebN-T5 [31] | HTML | 51.0% |
| WebGUM | HTML | 67.8% |
| WebGUM | HTML+Image | 75.5% |

| Methods | Modality | Perturbation | Success Rate |
|---|---|---|---|
| WebN-T5 [31] | HTML | Top | 24.7% |
| | | Bottom | 42.8% |
| | | Coordinates | 6.4% |
| WebGUM | HTML | Top | 53.6% |
| | | Bottom | 48.0% |
| | | Coordinates | 39.8% |
| WebGUM | HTML+Image | Top | 71.8% |
| | | Bottom | 64.7% |
| | | Coordinates | 62.6% |

FIG. 5

FIG. 6 tic-tac-toe click-pie grid-coordinate click-date-easy click-checkboxes-large search-engine

FIG. 8B

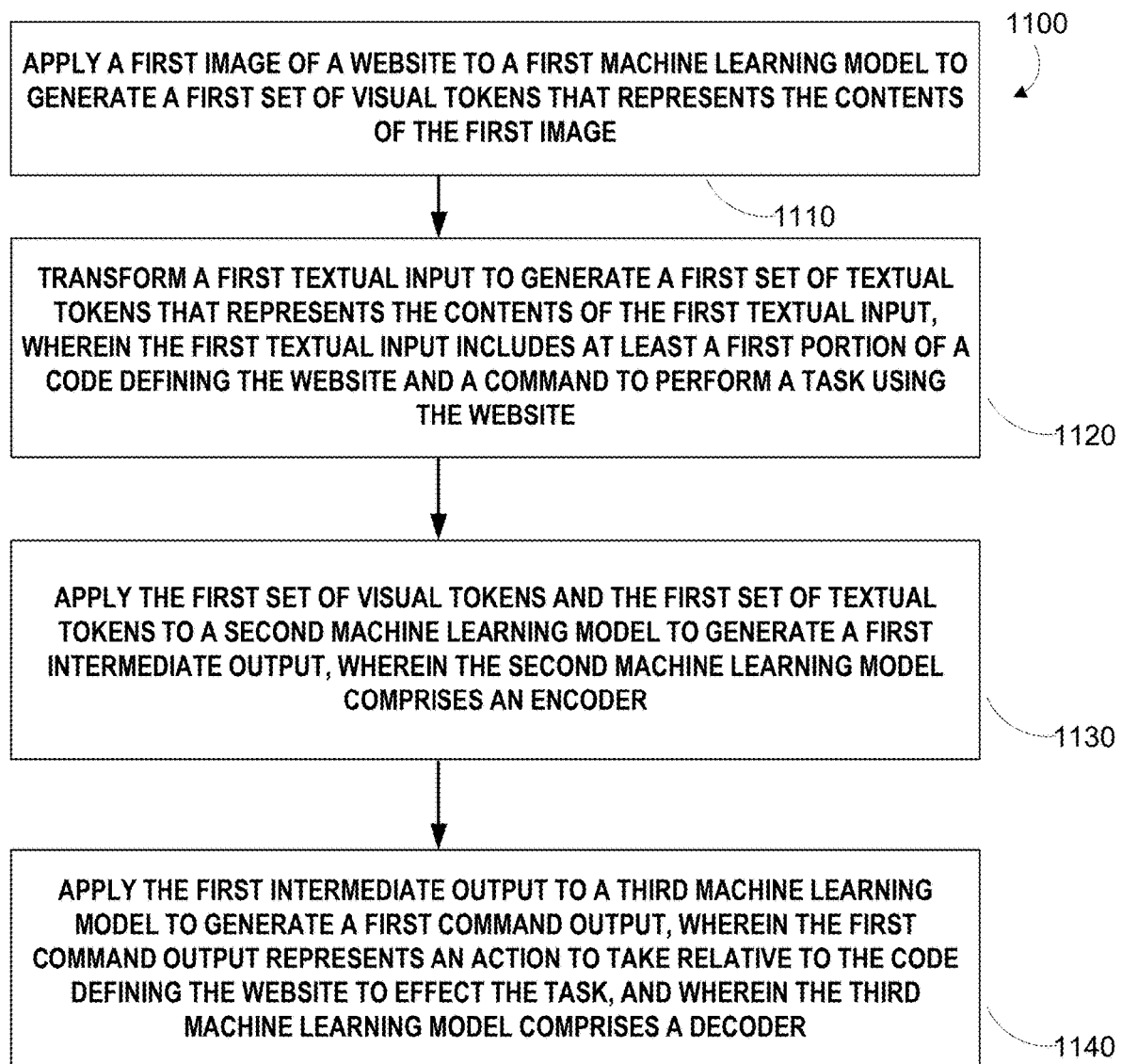

1100

APPLY A FIRST IMAGE OF A WEBSITE TO A FIRST MACHINE LEARNING MODEL TO GENERATE A FIRST SET OF VISUAL TOKENS THAT REPRESENTS THE CONTENTS OF THE FIRST IMAGE

1110

TRANSFORM A FIRST TEXTUAL INPUT TO GENERATE A FIRST SET OF TEXTUAL TOKENS THAT REPRESENTS THE CONTENTS OF THE FIRST TEXTUAL INPUT, WHEREIN THE FIRST TEXTUAL INPUT INCLUDES AT LEAST A FIRST PORTION OF A CODE DEFINING THE WEBSITE AND A COMMAND TO PERFORM A TASK USING THE WEBSITE

1120

APPLY THE FIRST SET OF VISUAL TOKENS AND THE FIRST SET OF TEXTUAL TOKENS TO A SECOND MACHINE LEARNING MODEL TO GENERATE A FIRST INTERMEDIATE OUTPUT, WHEREIN THE SECOND MACHINE LEARNING MODEL COMPRISES AN ENCODER

1130

APPLY THE FIRST INTERMEDIATE OUTPUT TO A THIRD MACHINE LEARNING MODEL TO GENERATE A FIRST COMMAND OUTPUT, WHEREIN THE FIRST COMMAND OUTPUT REPRESENTS AN ACTION TO TAKE RELATIVE TO THE CODE DEFINING THE WEBSITE TO EFFECT THE TASK, AND WHEREIN THE THIRD MACHINE LEARNING MODEL COMPRISES A DECODER

Figure 12:
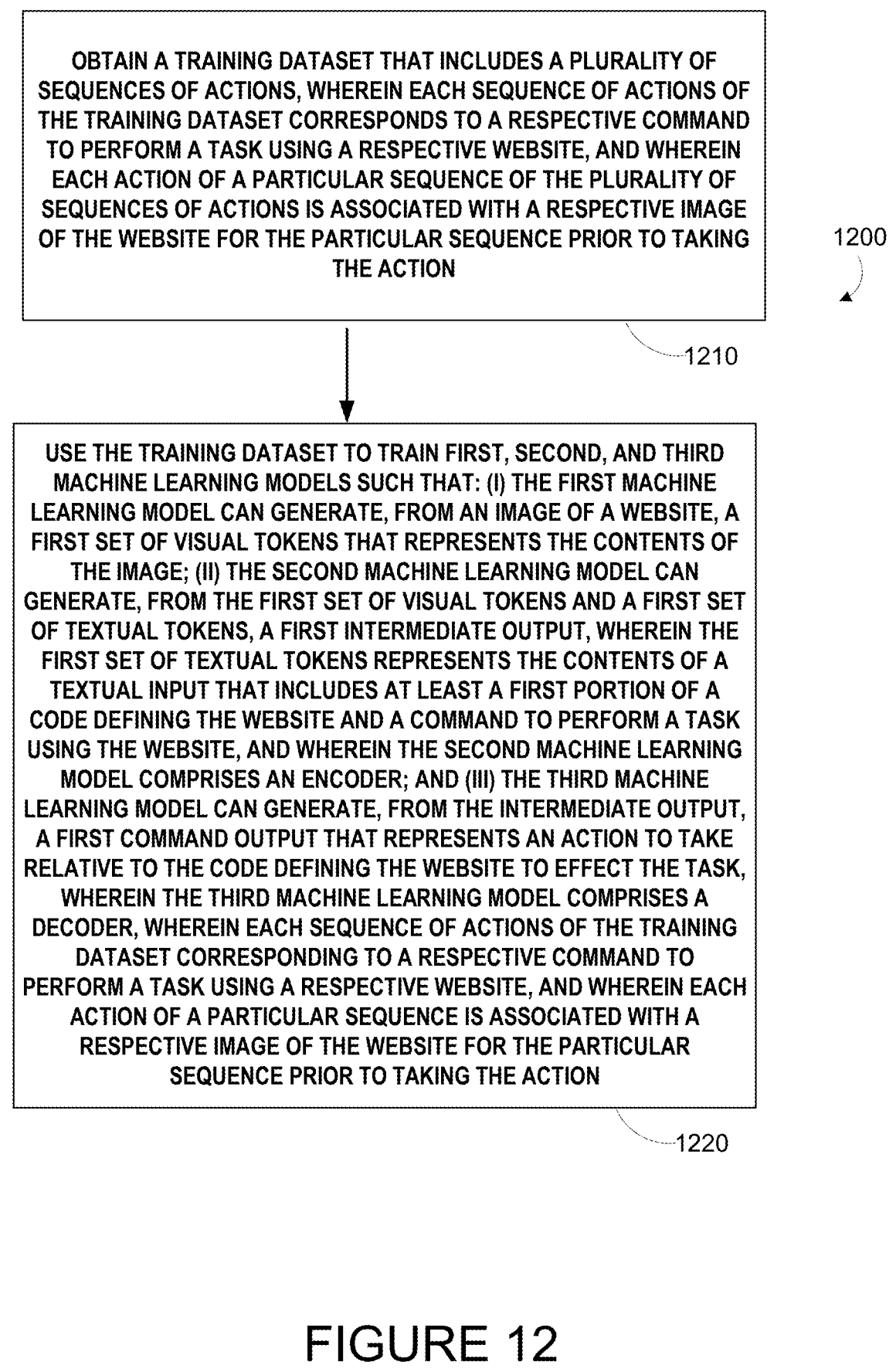

OBTAIN A TRAINING DATASET THAT INCLUDES A PLURALITY OF SEQUENCES OF ACTIONS, WHEREIN EACH SEQUENCE OF ACTIONS OF THE TRAINING DATASET CORRESPONDS TO A RESPECTIVE COMMAND TO PERFORM A TASK USING A RESPECTIVE WEBSITE, AND WHEREIN EACH ACTION OF A PARTICULAR SEQUENCE OF THE PLURALITY OF SEQUENCES OF ACTIONS IS ASSOCIATED WITH A RESPECTIVE IMAGE OF THE WEBSITE FOR THE PARTICULAR SEQUENCE PRIOR TO TAKING THE ACTION

1200

1210

USE THE TRAINING DATASET TO TRAIN FIRST, SECOND, AND THIRD MACHINE LEARNING MODELS SUCH THAT: (I) THE FIRST MACHINE LEARNING MODEL CAN GENERATE, FROM AN IMAGE OF A WEBSITE, A FIRST SET OF VISUAL TOKENS THAT REPRESENTS THE CONTENTS OF THE IMAGE; (II) THE SECOND MACHINE LEARNING MODEL CAN GENERATE, FROM THE FIRST SET OF VISUAL TOKENS AND A FIRST SET OF TEXTUAL TOKENS, A FIRST INTERMEDIATE OUTPUT, WHEREIN THE FIRST SET OF TEXTUAL TOKENS REPRESENTS THE CONTENTS OF A TEXTUAL INPUT THAT INCLUDES AT LEAST A FIRST PORTION OF A CODE DEFINING THE WEBSITE AND A COMMAND TO PERFORM A TASK USING THE WEBSITE, AND WHEREIN THE SECOND MACHINE LEARNING MODEL COMPRISES AN ENCODER; AND (III) THE THIRD MACHINE LEARNING MODEL CAN GENERATE, FROM THE INTERMEDIATE OUTPUT, A FIRST COMMAND OUTPUT THAT REPRESENTS AN ACTION TO TAKE RELATIVE TO THE CODE DEFINING THE WEBSITE TO EFFECT THE TASK, WHEREIN THE THIRD MACHINE LEARNING MODEL COMPRISES A DECODER, WHEREIN EACH SEQUENCE OF ACTIONS OF THE TRAINING DATASET CORRESPONDING TO A RESPECTIVE COMMAND TO PERFORM A TASK USING A RESPECTIVE WEBSITE, AND WHEREIN EACH ACTION OF A PARTICULAR SEQUENCE IS ASSOCIATED WITH A RESPECTIVE IMAGE OF THE WEBSITE FOR THE PARTICULAR SEQUENCE PRIOR TO TAKING THE ACTION

MULTIMODAL WEB NAVIGATION

BACKGROUND

Web navigation can be posed as a sequential decision making problem where agents use computers or crawl browsers following user instructions. Common web navigation tasks include, for example, form filling, information retrieval, or sending emails via a sequence of interactions with computer interface such as click or type. There has been a growing interest in developing autonomous web agents to automate these actions and release humans from repetitive interactions with computer interfaces.

The web navigation problem has been investigated in the online reinforcement learning (RL) context, to learn the optimal action distribution with task-specific models from scratch. However, online RL requires massive amounts of trial-and-error and is often infeasible in practice since failure in web navigation can often result in undesirable consequences. For example, wrong password entries may lead to account freeze, and sending email to the wrong person can be problematic in a business or personal context. Offline training from static datasets is an alternative for 'safe' development of web agents; however, performance has historically been less than for online RL counterparts. Additionally, prior work has been unable to generalize from rich out-of-domain data, as the prior work has used specialized models, e.g., to explicitly handle the hierarchical structures of document object model (DOM) formats and their dependencies (e.g., with LSTM, self-attention, or GNN). Additionally, prior work has been limited to outputs that exhibit only a fixed set of categorical actions, which is incompatible with truly open-ended web navigation in the real world.

Foundation models, e.g., large language models (LLM), have demonstrated superior performance in commonsense, symbolic, arithmetic, and multi-step logical reasoning. These models can engage in transformative generalization and are capable of solving wide ranges of interactive decision making problems in the wild, including but not limited to task planning in robotics, board games, web-based retrieval, and browser crawling.

SUMMARY

In a first aspect, a method is provided that includes: (i) applying a first image of a website to a first machine learning model to generate a first set of visual tokens that represents the contents of the first image; (ii) transforming a first textual input to generate a first set of textual tokens that represents the contents of the first textual input, wherein the first textual input includes at least a first portion of a code defining the website and a command to perform a task using the website; (iii) applying the first set of visual tokens and the first set of textual tokens to a second machine learning model to generate a first intermediate output, wherein the second machine learning model comprises an encoder; and (iv) applying the first intermediate output to a third machine learning model to generate a first command output, wherein the first command output represents an action to take relative to the code defining the website to effect the task, and wherein the third machine learning model comprises a decoder.

In a second aspect, a method is provided that includes: (i) obtaining a training dataset that includes a plurality of sequences of actions, wherein each sequence of actions of the training dataset corresponds to a respective command to perform a task using a respective website, and wherein each action of a particular sequence of the plurality of sequences of actions is associated with a respective image of the website for the particular sequence prior to taking the action; and (ii) using the training dataset to train first, second, and third machine learning models such that: (a) the first machine learning model is trained to generate, from an image of a website, a first set of visual tokens that represents the contents of the image; (b) the second machine learning model is trained to generate, from the first set of visual tokens and a first set of textual tokens, a first intermediate output, wherein the first set of textual tokens represents the contents of a textual input that includes at least a first portion of a code defining the website and a command to perform a task using the website, and wherein the second machine learning model comprises an encoder; and (c) the third machine learning model is trained to generate, from the intermediate output, a first command output that represents an action to take relative to the code defining the website to effect the task.

In a third aspect, a method is provided that includes: (i) applying a first image of an app to a first machine learning model to generate a first set of visual tokens that represents the contents of the first image; (ii) transforming a first textual input to generate a first set of textual tokens that represents the contents of the first textual input, wherein the first textual input includes at least a first portion of a code defining the app and a command to perform a task using the app; (iii) applying the first set of visual tokens and the first set of textual tokens to a second machine learning model to generate a first intermediate output, wherein the second machine learning model comprises an encoder; and (iv) applying the first intermediate output to a third machine learning model to generate a first command output, wherein the first command output represents an action to take relative to the code defining the app to effect the task, and wherein the third machine learning model comprises a decoder.

In a fourth aspect, a method is provided that includes: (i) obtaining a training dataset that includes a plurality of sequences of actions, wherein each sequence of actions of the training dataset corresponds to a respective command to perform a task using a respective app, and wherein each action of a particular sequence of the plurality of sequences of actions is associated with a respective image of the app for the particular sequence prior to taking the action; and (ii) using the training dataset to train first, second, and third machine learning models such that: (a) the first machine learning model is trained to generate, from an image of an app, a first set of visual tokens that represents the contents of the image; (b) the second machine learning model is trained to generate, from the first set of visual tokens and a first set of textual tokens, a first intermediate output, wherein the first set of textual tokens represents the contents of a textual input that includes at least a first portion of a code defining the app and a command to perform a task using the app, and wherein the second machine learning model comprises an encoder; and (c) the third machine learning model is trained to generate, from the intermediate output, a first command output that represents an action to take relative to the code defining the app to effect the task.

In another aspect, a non-transitory computer readable medium is provided having stored thereon program instructions executable by at least one processor to cause the at least one processor to perform the above methods.

In another aspect a system is provided that includes: (i) at least one processor; and (ii) a non-transitory computer-readable medium, having stored therein instructions executable by the at least one processor to cause the system to perform the above methods.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 5 depicts experimental results.

FIG. 6 depicts experimental results.

Figure 8B:
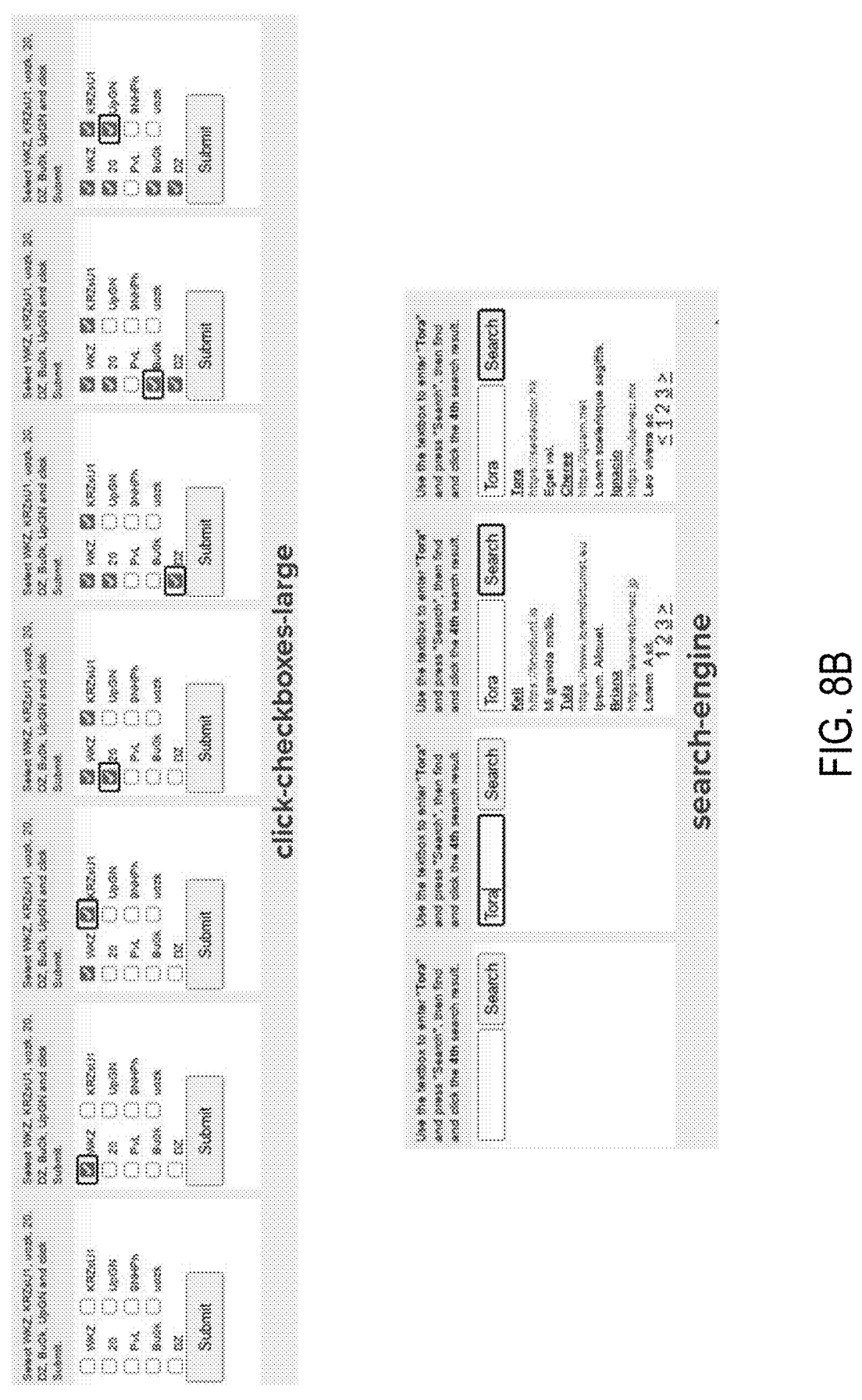

FIG. 8B depicts example experimental outputs.

FIG. 11 is a flowchart of an example method.

FIG. 12 is a flowchart of an example method.

DETAILED DESCRIPTION

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. Overview

Figure 1:
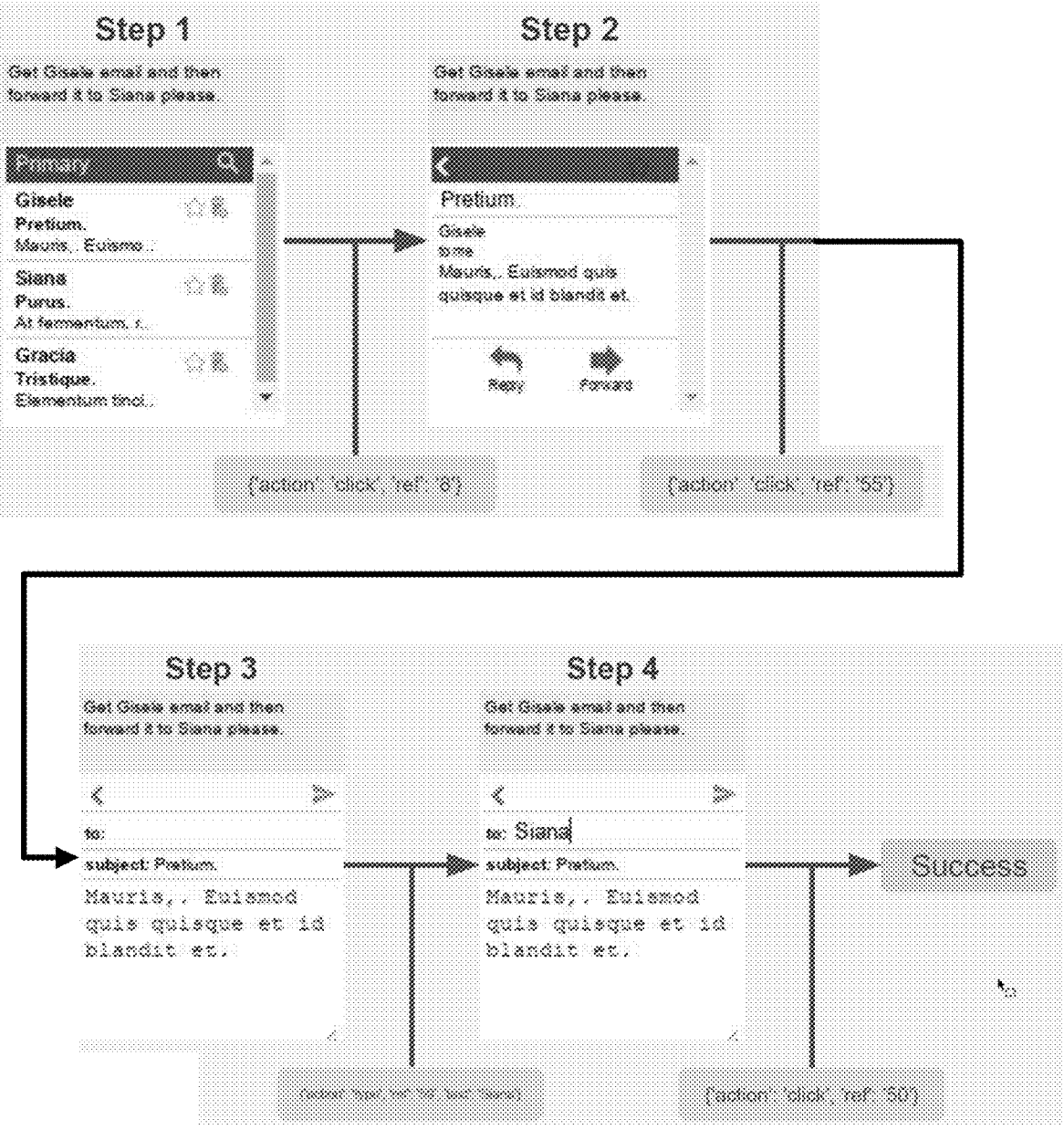
FIG. 1 illustrates aspects of an example episode of web navigation, according to an example embodiment.

It would be beneficial to provide trained machine learning models or other 'agents' to perform, in an automated manner, various web navigation or other tasks (e.g., app navigation) that human users would prefer not to perform themselves. For example, instead of navigating through the websites of one or more online retailers to find and purchase an item fitting a set of user constraints (e.g., price, color, type), the user could specify the set of constraints (e.g., in plain English or some other free-text manner) and the agent could then navigate the website(s) as permitted (e.g., without disregarding any limitations in robots.txt or other limitations imposed on such agents) to find, and optionally to purchase, an item that best satisfies the user's constraints. FIG. 1 illustrates steps that could be taken by an example automated agent to satisfy a user instruction ("Find Gisele's email and . . . "), including images of the website at each step, and the action taken by the agent at each step. The example of FIG. 1 is taken from the training dataset of the publicly available MiniWoB++ (an "email-inbox-forward-nl" task thereof). In that example, the agent clicks the email from the proper sender, and types the correct receiver to forward that email, to satisfy the given instruction.

However, creating (e.g., training) such an agent is difficult. While the problem can be posed as a Reinforcement Learning (RL) task, engaging in such learning in an online manner can lead to undesirable outcomes, e.g., sending emails to unintended recipients, triggering password lockouts, purchasing unwanted items, or other unwanted real-world effects of an agent interacting with systems on the web to learn. Offline learning (RL or otherwise), using stored training datasets that include representations of the actions and feedback associated with successful completion of instructed tasks (e.g., as in the example of FIG. 1), can avoid the unwanted real-world consequences of online learning, but suffer from a lack of available offline training examples, making it difficult to obtain good performance. Additionally, manually creating additional examples for such offline training is time-intensive, expensive, and difficult.

Since websites or apps are often defined by HTML or other code (e.g., Java, XML, Kotlin), a model could be trained to receive such code (e.g., code for a single page, code for a particular frame or interface of an app) and to predict therefrom actions to take, with respect to the website or app defined thereby, to accomplish a user request. However, in many examples aspects of a website or app (e.g., the image content of images, streamed video or other resources, contents generated by scripts, imagery or information rendered by a phone OS or other system running an app) may not be fully represented by the HTML or other website or app code that might be made available to the model. Additionally, presenting the code alone to such a model would require the model to understand not just the meaning of the elements rendered therefrom as a user might understand them, but also the specifics of the process of rendering the website or app interface from the code, a process which can be very hierarchical.

As noted above, the embodiments described herein can be used to navigate websites (using text of website-defining code and rendered images of websites) or apps (using text of app-defining code and rendered images of apps). Examples of such embodiments provided herein may include the use of such embodiments to navigate websites (or apps). It is to be understood that such examples can be modified to navigate apps (or websites) with appropriate modification (e.g., tokenizing XML, Kotlin, or other code that defines aspects of an app, instead of tokenizing HTML, XML, or other code that defines aspects of a website, or vice versa).

The embodiments described herein provide improved performance using less training data by applying multi-modal inputs to the agent (e.g., to one or more machine learning models thereof). In particular, the agents described herein receive one or more images of the website or app as a first visual input and a textual second input that includes at least a portion of the code defining the website or app, the user's command to perform a task using the website or app, and optionally additional information (e.g., representations of prior actions output by the agent). This allows the portion(s) of the agent (e.g., one or more machine learning models or sub-models, tokenizers, maps) that receive and operate on the website or app code portion of the textual input to 'focus' on the textual aspects of the code rather than attempting to 'render' a visual representation of the website or app therefrom, since the visual result of rendering the code is already provided to the overall model in the form of the visual input. Thus, improved performance can be obtained with fewer training examples.

To combine such multi-modal inputs, a first machine learning model receives the image input(s) and outputs a set of visual tokens therefor. The set of visual tokens is combined with (e.g., concatenated with) a set of textual tokens determined from the textual input (e.g., by application to another machine learning model and/or by tokenization and embedding) and the combined set of tokens is then applied to one or more machine learning models (e.g., to an encoder model whose output is applied to a decoder model to generate an output action) to generate an output that can be executed to pursue the commanded task.

Figure 2:
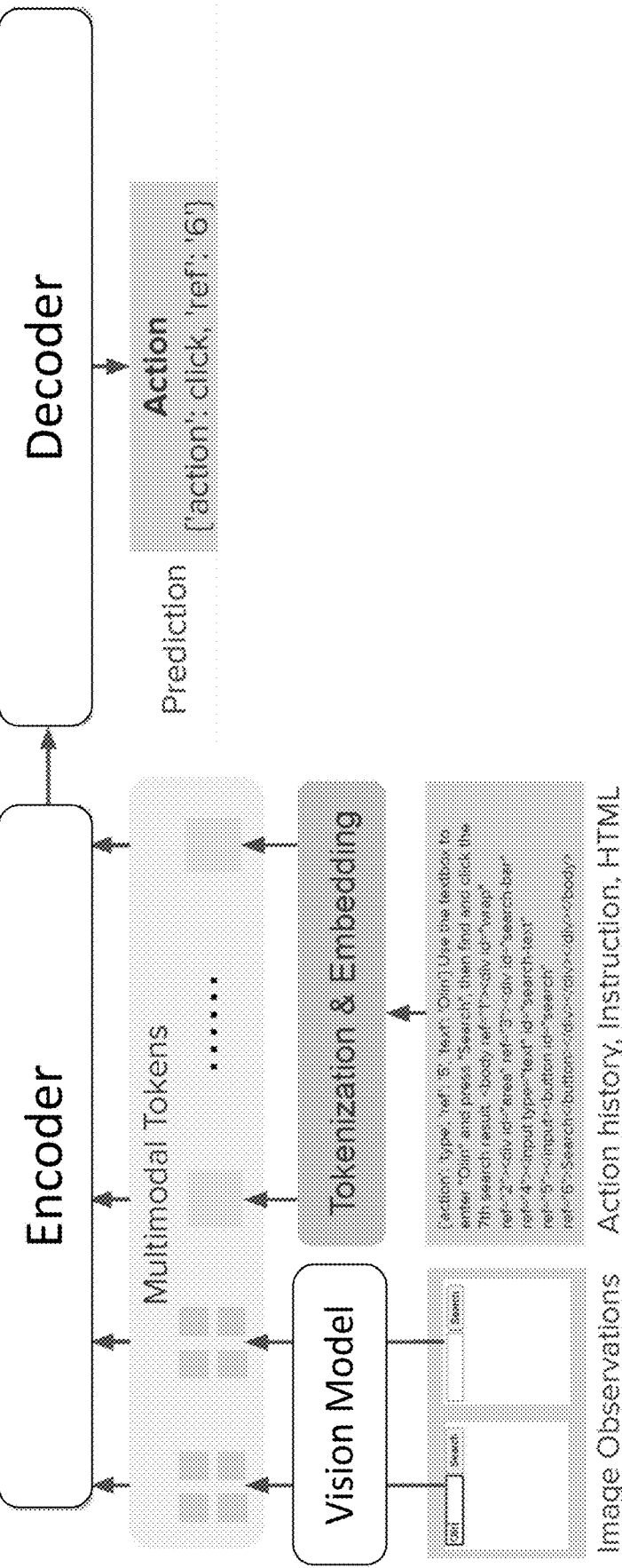
FIG. 2 depicts aspects of a multi-modal model for generating outputs for web navigation, according to an example embodiment.

FIG. 2 depicts an example embodiment of such an arrangement. The specific details illustrated in FIG. 2 are not meant to be limiting, and correspond to the "WebGUM" implementation that was experimentally validated (see below). The embodiment of FIG. 2 receives two recent screenshots, an action history of prior model output actions, the user's commanded instructions, and website code (HTML) as inputs. Image inputs were embedded to tokens for each 16×16-size patch of each input image via a pre-trained vision model (e.g., ViT, some other transformer-based vision model, or a non-transformer vision model), and the output was textual predictions of executable actions to pursue the user's commanded task. The combined multi-modal set of textual and image tokens was fed into a fine-tuned, and optionally pre-trained, encoder-decoder model (e.g., T5 or some other transformer model, or a non-transformer encoder-decoder model) to generate the output action.

The output action can then be executed in order to accomplish the user-commanded task. For example, a command, a packet, a request, or some other information based on the output action could be transmitted to a webserver that originally provided the code of the website. A response to the request could then be received from the webserver, containing additional code defining the website. For example, the response could include updated HTML defining another page of the website, e.g., a page linked to by an element of the previous-step code that the output action specified should be "clicked." This response could then be used to generate a new set of inputs to the model (e.g., rendering an image of the updated website to act as a new image input to the model, adding the new code and optionally a representation of the previous output action to act as a new textual input to the model) in order to generate a subsequent action to take in order to pursue the user's commanded task. This generation could include rendering the updated webpage to generate a new image of the webpage to provide as input to the visual model of the agent (e.g., in combination with the previous image of the previous state of the website that was previously applied to the visual model, and optionally additional images from prior states of the website).

The use of pre-trained models as a basis (either as in the specific example of FIG. 2, or otherwise as described herein) allows the amount of task-specific training data to be reduced. This is because pre-existing "foundation" models, or other pre-trained models for embedding visual and/or textual inputs and generating outputs therefrom, exist that represent a broad base of 'knowledge' about the world, including about the appearance, contents, and meaning of information on the web. Thus, such pre-trained models can begin with significant knowledge of images on the web, web code, and general information and thus require a smaller amount of finetuning, using a smaller amount of task-specific training data, to achieve high performance. Indeed, in some examples such models could be used 'as-is' as part of the embodiments described herein, with the models not updated based on task-specific training data. For example, a pre-trained visual model (e.g., a ViT vision transformer) could be used as part of the methods described herein, with only other models (e.g., downstream T5 or other transformer or non-transformer encoder/decoder models) being fine-tuned using the web navigation task-specific training data (i.e., the parameters of the pre-trained visual model would be unchanged following finetuning of the other models).

Additionally, pre-trained vision models, textual embeddings/models, and/or downstream models (e.g., transformer-type encoders and decoders) could be selected that generate tokens as output and/or receive tokens as input that project into the same 'semantic space.' This could make the fine-tuning of one or more of the models easier, since the models would begin the finetuning process being 'compatible' with each other with respect to the encoding of the informational content of the tokens passed therebetween.

The combined set of visual and textual tokens can be applied as inputs to a variety of different models or combinations of models to generate an output action. For example, the combined set of tokens could be applied as inputs to series of models, e.g., to a first encoder model (e.g., a T5 transformer encoder model, or some other type of transformer or non-transformer model, as shown in FIG. 2) whose outputs are applied as inputs to a second decoder model (e.g., a T5 transformer decoder model, or some other type of transformer or non-transformer model, as shown in FIG. 2) that then generates an output action. The output action could be posed as a free text output that specifies, in a pre-specified textual format, an element of the website code to interact with (e.g., a button, a text box), how to interact with the element (e.g., to click, to input text), and optional auxiliary information (e.g., text to input, if the method of interaction with the element is "input text").

Posing the output as free text (rather than, e.g., a numerical output specifying the element to interact with and a categorical output specifying the type of interaction) allows pre-existing text-generating models (e.g., large language models (LLMs)) to be used as the initial starting point for these models. This allows "foundation" text-outputting models, which as noted above can represent a great deal of 'general knowledge' about the world, about the web, etc., to be used as the initial state for the models described herein. These models can then be finetuned, using web navigation task-specific training data, to arrive at a combination of visual and textual models that exhibit high performance at web navigation to accomplish user-commanded tasks. In some examples, the encoder and/or decoder models that receive the set of visual and textual tokens and generate therefrom textual output actions could be finetuned from pre-trained models (e.g., LLMs). Such pre-trained models may have been instruction-finetuned to accomplish tasks that were specified textually as instructions in the model input, e.g., instructions to label an input image, to answer a question, to debug code. For example, the encoder and decoder of an agent as described herein could be generated by starting with the Flan-T5 LLM, and then further finetuning that model via supervised learning from a training dataset of example web navigation tasks (e.g., example tasks from the MiniWOB++, WebShop, or other benchmarks). The use of such pre-trained models, which already represent a great deal of knowledge about the world, text, the web, etc., can allow agents as described herein that are developed from such pre-trained models to achieve high levels of performance while using relatively less training data.

Note that, in some applications (e.g., web crawling), an agent as described herein could be limited with respect to the types of action it can engage in, or even with respect to whether the agent is permitted to interact with or even to ingest at all certain web pages. For example, the robots.txt of a web site may indicate that web crawlers are not permitted to index the content of the web site. In examples wherein an agent as described herein outputs an action that would contravene such a limitation (e.g., to navigate to a page whose robots.txt does not permit such an action), the agent could be prevented from doing so. In such an example, an indication of this failure could be provided as part of the input to the agent (e.g., in addition to the user's textual input and other contextual information, text indicating that "navigation to www.prohibiteddomain.net is not permitted" could be provided to the agent) to re-generate an alternative output that is indicative of a permitted action.

The image(s) input to the visual model of the agent could be used in a variety of ways to generate a set of visual tokens for input to downstream model(s) of the agent. For example, tokens could be generated for overlapping or non-overlapping patches of the image to provide region-level representations of the image. Additionally or alternatively, one or more tokens could be generated for an input image at the whole-image level. A single 'current' image of the website could be provided to generate visual tokens thereof as input to downstream models of the agent. Alternatively, multiple images, representing the visual state of the website at multiple points in time, could be provided as input to the agent. For example, a first input image could represent the 'current' visual state of the website, following the execution of the most recent action output of the agent, and a second input image could represent the historical visual state of the website prior to execution of the most recent action output of the agent. More than two images could be provided, e.g., one image representing the 'current' visual state of the website and each other image representing the visual state of the website prior to execution of a respective previous action output of the agent.

The various embodiments described herein allow for the training of automated web navigation agents (e.g., for the training of one or more models of such an agent) that exhibit improved performance using less training data. Additionally, as illustrated by the experimental results below, the agents described herein (e.g., WebGUM) are able to achieve improved performance using fewer model parameters, and thus decreased computational cost to execute (e.g., with respect to memory use, with respect to cycle use).

The use of larger sets of training data can lead to improved performance, whether using an agent as described herein or an alternative variety of agent. Accordingly, an improved method for using an initial corpus of training examples to generate additional high-quality training examples is provided herein. This method includes using an agent as described herein (e.g., WebGUM) or some other web-navigating agent to execute a variety of user commands to accomplish web-based tasks. As the agent attempts to perform a given task, images of the website, textual inputs to the agent, and textual outputs from the agent for each step of the attempt could be recorded. The recorded information from successful attempts could then be retained as examples of web navigation that could then be used to further train the agent. The determination of whether a given attempt was successful could be verified manually (which would take less time than manually performing the entire attempt) and/or programmatically. Such a process could be repeated a number of times, to result in a large number of training examples in a small amount of time and with reduced or no human effort. Indeed, after one or more repetitions of such a training example-generating process, the 'manual' examples from the training dataset (i.e., the examples of the training dataset that were not generated by the agent) could be omitted from use in training the agent. This could be beneficial in that the agent-generated training examples could be more straightforward, more amenable to implementation by the agent, or otherwise improved relative to human-generated training examples.

II. Experimental Results

The embodiments described herein were implemented and experimentally validated. The particulars and results of this experimental validation are provided in this section. Note that the particulars described in this section are intended only as illustrative, non-limiting examples of the embodiments described herein.

Pre-trained foundation models were used in a competitive offline learning context to generate improved autonomous web agents. To enable the overall model to engage in grounded spatial understanding, therefore improving web navigation, the model was configured to observe both HTML and screenshots by combining a language model and a ViT, resulting in intermediate model inputs including semantically rich multimodal tokens. Additionally, since web navigation tasks are by nature instruction-following, the language model was based on (e.g., fine-tuned from) an instruction-tuned LLM instead of self-supervisedly pre-trained LLMs. To improve the training of the models described herein, a large multimodal corpus of training data was assembled, with both HTML and screenshots, to fine-tune the language model and ViT jointly. The models described herein were then trained to output actions (e.g., commands) in free-form text. The models described herein, incorporating these features, provide a multimodal web agent, which may be referred to herein as Web navigation via Grounded Understanding Models (or "WebGUM"). As shown in FIG. 1, the experimentally-evaluated model of the present disclosure takes in a command for a web-based task via a natural language instruction (e.g., in an email client, "Find Gisele's email and forward it to Siana, please.") and uses multimodal observations of the computer interface to complete the task via a sequence of computer actions.

Through evaluation on MiniWoB++ [70, 55], a representative web navigation benchmark with simulated websites, the multimodal models described herein outperformed previous best offline approaches trained with HTML inputs by 31.9%. WebGUM closed the performance gap to the best existing online RL approaches, despite being trained fully offline with much fewer experiences. Extensive ablations were performed and analyzed to demonstrate WebGUM's advantages with respect to (1) multimodal vision-and-HTML observations, (2) HTML understanding, (3) ability to engage in multi-step reasoning, and (4) dataset and model size scaling. WebGUM leverages multimodal tokens to ground vision and HTML understanding on the computer interface, for example to solve multi-step tasks with dynamic page transitions or tasks that implicate global contexts, such as booking flights, crawling social media, or shape recognition. Using instruction-finetuned language models, rather than self-supervised pre-trained models, improved the success rate on MiniWoB++ by over 25%, and resulted in improved outcomes when handling unknown tasks or out-of-distribution HTML inputs synthesized with realistic perturbations. On the WebShop benchmark, it was experimentally demonstrated that the models described herein are capable of multi-step reasoning, resulting in enhanced downstream decision-making and achieving superior performance even to the few-shot PaLM-540B model, despite the model described herein having only 3 billion parameters. The experimental results herein also confirm the importance of both model and dataset scaling in multimodal web navigation; 347K multimodal expert demonstrations were collected on MiniWoB++, 38 times larger than the existing unimodal dataset.

TABLE 1

Comparison with prior attempts at the web navigation problem that used online RL to learn the optimal action distribution with task-specific model architectures from scratch (*or partially using a pre-trained vision encoder). The present disclosure omits the web-specialized architecture and input-output space, converting web navigation into a visual question-answering format (text, image → text), allowing the models to be trained offline by leveraging pre-trained foundation models in vision or language domains as strong inductive bias for web environments.

| Methods | Architecture | Pre-trained | Input | Output | Offline |
|---|---|---|---|---|---|
| WGE | LSTM, self-attention | NO | DOM | Logit of action | NO |
| CoDE | Bi-LSTM | NO | DOM | Logit of action | NO |
| DOM-Q-NET | GNN | NO | DOM | Logit of action | NO |
| CC-Net | LSTM, Transformer, ResNet | NO* | DOM, Screenshot | Logit of action | NO |
| WebShop | BERT, BART | YES | Text (from HTML) | Logit of action | NO/YES |
| WebGUM (Present Disclosure) | T5 Transformer, ViT | YES | HTML, Screenshot | Text | YES |

MiniWoB++ is one of the most inclusive and representative benchmarks for testing the capability of autonomous agents. MiniWoB++ includes of a set of simulated websites with various user instructions from primitive tasks to complex multi-step decision-making tasks, such as sending emails or booking flights. As shown in Table 1, prior approaches depended on task-specific hierarchical structures of DOM, tailored architectures to encode their dependencies such as LSTM, self-attention, or GNN, and task-dependent categorical output spaces, which could not handle open-ended multi-task settings similar to real world, nor incorporate pre-trained models. In contrast, the embodiments disclosed herein eschew such web-specific architectures and convert web navigation into a visual question-answering format (text, image→text), allowing pre-trained foundation models to be optionally leveraged as rich prior knowledge about the web, and then to learn the improved web-navigation agents via offline training.

Autonomous web navigation was formulated as a deterministic sequential decision making problem; composed of a state space S, action space A, deterministic transition function $T:S \times A \rightarrow S$, instruction space G, reward function (or episodic success criteria) $r:S \times G \times A \rightarrow \{0,1\}$. At each time step t, the agent follows a parameterized policy conditioned on previous states and actions $$\pi: \underbrace{S \times \ldots \times S}_{\times t} \times \underbrace{\mathcal{A} \times \ldots \times \mathcal{A}}_{\times t} \times G \rightarrow \mathcal{A},$$

and transits to the next state: $s_{t+1}T(s_t,a_t)$. This process continues until the agent reaches the terminal state (e.g. a "Submit" button is clicked) or the max time step is exceeded. The episode is treated as a success if a given instruction g is satisfied (i.e. $r(s_t,g,a_t)=1$), and as a failure if the agent takes an invalid action or reaches a wrong terminal state.

In autonomous web navigation, the state $s_t \in S$ was formulated as a web page consisting of the raw HTML as a text sequence and a screenshot as an image. The action space was constrained as: function(selector, text). 'function' is either click or type, 'selector' is an integer index that can uniquely specify an element to be operated on (e.g., 'clicked' or typed into), and 'text' is a text input for the 'type' function.

FIG. 1 depicts an example episode from MiniWoB++ that involves multi-step decision-making. To accomplish the given instruction ("Find Gisele's email an . . . "), the agent clicks an email from the proper sender and types the correct receiver to forward that email. MiniWoB++ also includes primitive behavioral tasks such as clicking buttons or entering texts.

The embodiments described herein use an encoder-decoder architecture for HTML-based web navigation, as this bi-directional nature corresponds well to the tree structure of HTML and exhibits good scaling. T5, an encoder-decoder transformer-based language model, was expanded to include for multimodality. As shown in FIG. 2, the encoder considers a set of ViT-encoded visual tokens from a history of screenshots (e.g., H=2 steps) and a set of text tokens that represent an action history, the user instruction, and raw HTML. The encoder transformer handles both visual and text tokens in a unified manner, and the decoder predicts actions in text.

TABLE 2

Average success rate on MiniWoB++ among 56 tasks. WebGUM significantly outperformed
the previous finetuned-LLM with 3B parameters, which was the recent best among offline
methods, or its multimodal variant (MM-WebN-T5) even with 2.8K dataset and Base-size
model (310M parameters). Scaling dataset and model size, WebGUM was close to reaching
the online RL-finetuned state-of-the-art, despite fully offline training.

| Methods | Modality | Pre-trained Models | Offline | Dataset | Success Rate |
|---|---|---|---|---|---|
| CC-Net (SL) [36] | DOM + Image | ResNet | YES | 2.4M | 32.0% |
| WebN-T5 [31] | HTML | T5-XL | YES | 12K | 48.4% |
| MM-WebN-T5 | HTML + Image | T5-XL, ViT-B16 | YES | 347K | 55.6% |
| WebGUM (Ours) | HTML + Image | Flan-T5-Base, ViT-B16 | YES | 2.8K | 61.1% |
| | HTML | Flan-T5-XL | YES | 347K | 75.5% |
| | HTML + Image | Flan-T5-XL, ViT-B16 | YES | 347K | 80.3% |
| WGE [55] | DOM | — | NO | 12K+ | 64.6% |
| CC-Net (SL + RL) [36] | DOM + Image | ResNet | NO | 2.4M+ | 96.4% |

+in Dataset column means extra billions of frames are required during the online RL phase.

To map image observations (website screenshots) into visual tokens for the T5 encoder, a vision transformer (ViT) was used that had been pre-trained on the ImageNet-21K classification. To extract improved spatial and semantic information from the screenshots of websites, the T5 encoder considered one token per patch rather than a single token per image. Input images were divided into 16×16 patches—giving a total of 14×14 (number of patches)×2 (context window)=392 visual tokens. Screenshots from MiniWoB++ were cropped to remove the yellow instruction part (as shown in FIG. 1), and the image size became 160×160. Imaged were pad cropped with white pixels to fit them into 224×224, the default input size for ViT.

The experimentally evaluated language model was based on an instruction-finetuned T5, Flan-T5, rather than a 'vanilla' pre-trained T5. Flan-T5 is finetuned with large-scale instruction-following format problems and few/zero-shot chain-of-thought examples across a variety of domains, including reasoning and programming. Since web navigation can be posed as an instruction-following task, such instruction-finetuned models are able to generalize well to enhance alignment with user instructions and zero-shot reasoning in the web-navigation, interactive decision-making context. Such instruction-finetuned models also proved for improved sample efficiency and downstream performance, facilitating offline learning. The Flan-T5 language model and the ViT vision encoder were finetuned jointly (FIG. 2) on a large corpus of instruction-following multimodal web navigation data. The experimental results provided herein empirically demonstrate that this instruction-finetuned method improves HTML comprehension and multi-step reasoning and decision making significantly.

Successful foundation models are largely powered by internet-scale data. While a large amount of data is often highly beneficial for model training, in the web navigation domain, there is only a small public dataset available for MiniWoB++, consisting of 12K episodes of human demonstration. Additionally, this dataset consists only of DOM observations and lacks visual features, which might limit the spatial perception of the elements on a page. A large-scale multimodal dataset, including screenshots of websites, was generated using the embodiments described herein to build a better navigation policy at scale.

To generate such a huge amount of multimodal behavioral data, a public finetuned-LLM policy was trained with human demonstrations for data collection, instead of hiring human demonstrators. This significantly reduced the time and the cost to construct the new dataset by leveraging the prior success of autonomous agents. The dataset size was gradu-ally increased. First, an LLM policy with 100 episodes per task was rolled out, which resulted in 2.8K successful episodes. Then, Flan-T5-XL models were finetuned with this relatively small dataset and run with 10,000 episodes per task. Such efforts resulted in a multi-task 347K-episode dataset with HTML and screenshots at each time step, generated by proficient LLM-based agents.

Figures 3, 4:
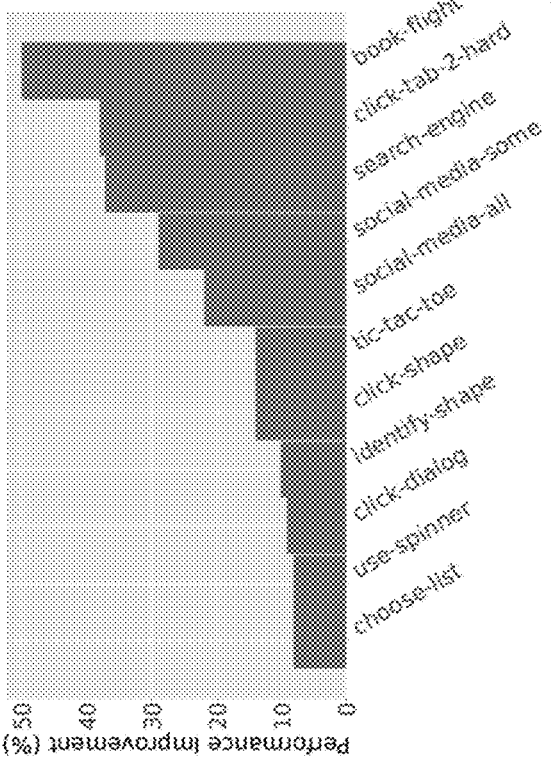
FIG. 3 depicts experimental results.
FIG. 4 depicts an example experimental output and experimental results.

FIG. 3: (Left) Average success rate with white/random image inputs, single/multiple visual tokens, and history length (H=1,2). Flan-T5-XL was used for white/random image ablations, and Flan-T5-Base was used for visual tokens and history length ablations. The results show that WebGUM successfully leveraged spatial and temporal information from image modality, and multiple visual tokens from patches were able to extract much richer features than a single visual token per image. (Right) Top-10 performance improvement among MiniWoB++ examples by adding the image modality to HTML. The success rates were subtracted to compute absolute improvement: (Success Rate of WebGUM(HTML+Image))−(Success Rate of WebGUM (HTML)). Image modality was leveraged for multi-step tasks with dynamic page transitions or tasks that require global perception (e.g. book-flight or tic-tac-toe).

The models and methods described herein were tested on the MiniWoB++ benchmark with 100 evaluation episodes per task, taking the average success rate over 56 tasks. Due to the significant computational requirements, one seed was run to train each model. Table 2 shows that WebGUM, with a small 2.8K dataset and Base-size model (310M parameters), significantly outperformed previous offline methods for web navigation, including the multimodal variant of the recent best method, MM-WebN-T5. While these alternative models used 2.4 million episodes or 3 billion parameters, WebGUM was able to improve the data and parameter efficiency to achieve superior performance in the offline regime. These results were obtained by modifying the web navigation problem as described herein in order to leverage visual modalities and instruction-finetuned LLMs as strong inductive bias on web environments. In addition, when scaling dataset and model size, WebGUM achieved an 80.3% success rate, exceeding the previous best offline model, WebN-T5, by over 31.9% and being close to reaching the online RL-finetuned SoTA, CC-Net (−16.1%), despite WebGUM having been trained fully offline and using significantly less training data. The per-task comparison showed that online-finetuned CC-Net was still better at some multi-step, long-horizon tasks (e.g. choose-date or guess-number), although WebGUM also showed improvements on those tasks. These results illustrate that modifying the web navigation problem as described herein to incorporate foundation models for efficient offline training results in a scalable and deployable approach for real-world web automation where, e.g., online interactions are prohibitively costly.

A variety of ablations of WebGUM were performed to identify sources of these technical improvements.

Two of the ablation tests included: replacing image observations with completely white images, and with randomly sampled MiniWoB++ screenshots taken in the initial states. In addition, the particular design choices for the image observations (multiple tokens from patches, and historical observations with H=2) were investigated. XL-size models were used for white/random image ablations, and Base-size models for visual tokens and history length ablations.

FIG. 4: (Left) Example of compositional evaluation on MiniWoB++. Two different tasks (click-link and click-button) were combined into a single-page sequential task (click-link_click-button) at test time. (Right) Average success rate on 6 compositional MiniWoB tasks. WebGUM generalized combinational tasks better than, e.g., Gur et al. "Understanding html with large language models." arxiv:2210.03945, 2022, achieving better success rates by over 24.5% (HTML+ Image) or 16.8% (HTML).

FIG. 5: (Left) Example of input perturbation for Mini-WoB++ evaluation, taken from click-button. Three different types of perturbations were prepared at test time: adding extra HTML at the top of the original input HTML (left) or at the bottom (middle), and adding task-irrelevant attributes in each element (right) such as coordinate information (left, right, top, bottom). Extra HTML from the 12K dataset was randomly sampled. (Right) Average success rate of perturbation evaluation over MiniWoB++56 tasks. The results show that while all the methods were affected by input corruptions to some extent, WebGUM, especially with multimodality, achieved significantly better performance than previous finetuned-LLM.

FIG. 3 (left) shows that the performance of the model with white images was comparable to the unimodal HTML model. Because the model with randomly taken images may accidentally contain the images from the target task, WebGUM (random) slightly surpasses WebGUM (white). These results prove that WebGUM successfully obtained grounded vision and HTML understanding for web navigation by leveraging semantic and spatial information from the image modality. Multiple visual tokens from patches outperformed a single visual token per image, showing that the individual tokens extract much richer task-relevant features. Additionally, historical image observations (H=2) contributed to the improvement more than single-step observation (H=1), which encodes temporal task information.

Per-task performance gaps caused by adding the image modality to the instruction finetuned LLM were also investigated. FIG. 3 (right) shows the top-10 absolute performance improvement, which shows that WebGUM leveraged visual inputs for multi-step tasks with dynamic page transitions (e.g. book-flight or search-engine) or the tasks that required global context perception of the page (e.g. tic-tactoe or click-shape).

Table 2 shows that, thanks to the instruction-finetuned LLMs used to generate it, WebGUM significantly outperformed MMWebN-T5 by 24.7%. To analyze the effect of instruction-finetuning more specifically, the HTML understanding capability of WebGUM was investigated. As a test bed for HTML comprehension, (1) generalization to unseen compositions of known tasks, and (2) robustness to the realistic input perturbations were investigated, which are also important challenges for the web agents when deployed on the real-world internet.

For the compositional tasks, four click-"something" (link, button, checkboxes, dialog) tasks were chosen and six combinations thereof were created by naively stitching together two or three tasks (e.g., FIG. 4). These tasks were resolved in order. The results show that WebGUM with HTML and image inputs outperformed prior finetuned-LLMs by over 24.5%, showing that WebGUM obtained better reading skills to control computers and was able to transfer these skills to handle unseen HTML in compositional tasks

TABLE 3

Average score and success rate on WebShop tasks. WebGUM achieved 45.0% success, outperforming baseline approaches including ReAct, a prompted PaLM-540B.

| Methods | Training | Models | Score | Success Rate |
|---------|----------|--------|-------|--------------|
| Rule | — | — | 45.6 | 9.6% |
| IL | SL | BART, BERT | 59.9 | 29.1% |
| IL + RL | SL + RL | BART, BERT | 62.4 | 28.7% |
| Act | In-context | PaLM-540B | 62.3 | 30.1% |
| ReAct | In-context | PaLM-540B | 66.6 | 40.0% |
| WebN-T5 | SL | T5-XL | 61.0 | 29.8% |
| WebGUM | SL | Flan-T5-XL | 67.5 | 45.0% |

To evaluate the robustness of WebGUM against input corruptions, three different realistic perturbations were evaluated; adding extra HTML at the top or bottom of the original HTML, and adding attributes of coordinates (left, right, top, bottom; unrelated to solving the tasks) in each element of HTML at test time. Such perturbations often occur in the real world due to page renewal or API changes, or navigation to unknown websites, and rule-based preprocessing may not fully cover these conditions. The results show that while all the methods were affected by these input corruptions to some extent, WebGUM, with both HTML and HTML plus image modalities, achieved significantly better performance than the method of Gur et al. Notably, WebGUM outperformed prior finetuned LLMs (+56.2% in multimodal and +33.4% in unimodal models) even when additional distracting attributes were added to HTML. This shows that instruction-finetuning improves HTML comprehension in WebGUM, enabling it to deal with out-of-distribution inputs or tasks robustly.

To decouple the evaluation of multi-step reasoning capability from visual page perception, HTML understanding, and the benchmark simulator (MiniWoB++), WebGUM was extensively evaluated on WebShop, another online-shopping website simulator with a large amount of real-world product data. Because such a task requires complex multi-step decisions made in consideration of previous contexts for item comparison, WebShop is well suited to investigating multi-step reasoning capability in depth. WebShop provides a user instruction that describes the features of item (e.g. I need a long clip-in hair extension which is natural looking, and price lower than 20.00 dollars). The agents should search, compare and choose a proper product that matches the given instruction. The performance score is evaluated by the percentage of required attributes covered by the chosen product, and if the product meets all the requirements, that episode is labeled a success.

Table 3 shows that WebGUM achieved 45.0% success, significantly outperforming not only simple baselines, such as supervised imitation learning (IL), IL plus RL-finetuning and WebN-T5 (by more than 15%), but also prompt-based LLM agents, including ReAct (i.e. PaLM-540B with one-shot prompt and reasoning annotations), even though the model as described herein had only has 3 billion parameters. Due to the consistent reasoning and enhanced alignment with user intentions, WebGUM could compare the products with backtracking, and choose proper options. Because BERT, BART, or T5 do not have reasoning capabilities while Flan-T5 does, these results show that WebGUM was able to engage in multi-step reasoning, transferring prior knowledge for downstream decision making.

To investigate model scalability to dataset size, three datasets were prepared: a minimal 2.8K demonstration, 347K demonstrations, and 20%-size demonstrations (68K). FIG. 6 (left) shows that increasing dataset size lead to improvements in success rate. This also shows that larger dataset size is especially important for multimodal models. Notably, Base-size WebGUM, even with only 2.8K HTML episodes, achieved 55.7%, surpassing previous SL state-of-the-art (48.4% by Gur et al.).

FIG. 6: Average success rate of WebGUM with different datasets (left) and model sizes (right). The X-axis is a logarithmic scale. As with both HTML-only and multimodal models, there is a strong scaling effect: the larger the dataset and model size were, the higher the success rates.

In addition to dataset size, FIG. 6 (right) shows that the performance of WebGUM improved as the number of parameters in T5 model increased from Base (220M) to XXL (11B). These results also show that the effect of model scale may be greater than the effect of dataset size; the low-capacity model may cap the obtainable performance level at a lower level.

The models and methods described herein (e.g., WebGUM) provide the benefit of being trainable using only offline training examples. This avoids a variety of unwanted circumstances, for instance, the wrong password causing an account freeze, or emailing the wrong person.

The models described herein include encoder-decoder models configured as multimodal transformers, incorporating a vision transformer that may be pre-trained, e.g., with ImageNet-21K as an image encoder for the visual tokens. ViT-B16 can be used, a small-size transformer with 86 million parameters and that divides an input image into 16×16-size patches. Publicly available checkpoints of T5, Flan-T5, and T5-XL finetuned with MiniWoB++ demonstrations were used as initial pre-trained models for the experiments described herein. The encoder-decoder architectures of the models described herein were, when trained as described herein, able to solve HTML-based web navigation tasks. The SeqIGO was used to construct the training pipeline and the SentencePiece vocabulary with 32K tokens from the C4 dataset was used for text tokenization. The batch size for training was 128, and input sequence length was set to 4096 tokens. Cloud TPU-v4 was used, which had a 32 GiB HBM memory space for the experiments. Base-size models used 256 cores and XL-size models used 512 cores, each taking 1-2 days for finetuning.

Some tasks in MiniWoB++ may exceed this limit due to the max input length of 512 set in prior works, especially for complex webpages with many contents (Table 4). Different input lengths were investigated in Table 5. WebGUM surpasses WebN-T5 with 512 tokens by 17.7%, and consistently improved performance in both HTML and HTML+image inputs, as the input length increased from 512 to 4096 tokens (+14.2%). 4096 tokens was set as the default length in this experiments described herein.

16

TABLE 4

Statistics of input tokens in the 347K dataset. While the average was 507 tokens, the maximum length was over 4K tokens, since some tasks in MiniWoB++ have complex webpages with many HTML elements.

| Min | Mean | 90% Percentile | 95% Percentile | Max |
|-----|------|----------------|----------------|-----|
| 77 | 507 | 870 | 1823 | 4072 |

Scaling up the dataset and model size in WebGUM results in improved performance. For dataset size ablation, Flan-T5-Base and ViT-B16 were used. For both the HTML and multimodal models, scaling effects were observed in web navigation: the larger the dataset (Table 6) and model (Table 7) size were, the higher the success rates were. The models described herein, even with only 2.8K HTML episodes (about 25% of the previous state of the art) and Base-size model (about 7.3% parameters) already achieved 55.7%, surpassing previous SL state-of-the-art (48.4% by Gur et al.). Such efficiency may be the result of inductive bias and alignment with user intentions represented in instruction-finetuned LLMs. The results show that scaling the models may have greater effects on performance than training dataset size; low-capacity models may cap the achievable performance, regardless of the training dataset size, at a lower level.

TABLE 5

Average success rate with different input sequence lengths. The models were initialized with Flan-T5-XL (+ViT-B16) and trained with the 347K-episode dataset described herein. WebGUM consistently improved performance in both HTML and HTML + image inputs, as the input length inscreased from 512 to 4096 tokens.

| Methods | Modality | Input Length | Success Rate |
|---------|----------|--------------|--------------|
| WebN-T5 [31] | HTML | 512 | 48.4% |
| WebGUM | HTML | 512 | 61.5% |
| WebGUM | HTML | 1024 | 68.8% |
| WebGUM | HTML | 2048 | 73.5% |
| WebGUM | HTML | 4096 | 75.5% |
| WebGUM | HTML + Image | 512 | 66.1% |
| WebGUM | HTML + Image | 1024 | 70.7% |
| WebGUM | HTML + Image | 2048 | 75.0% |
| WebGUM | HTML + Image | 4096 | 80.3% |

TABLE 6

Average success rate of WebGUM with different dataset sizes. The larger the dataset size was, the higher the success rate was. The approach described herein outperformed the previous state-of-the-art by over 7.3% even with the limited 2.8K-episode dataset (about 25% of the previous state of the art dataset.)

| Pre-Trained Models | Modality | Dataset | Success Rate |
|--------------------|----------|---------|--------------|
| T5-XL [31] | HTML | 12K | 48.4% |
| T5-XL | HTML | 347K | 49.8% |
| Flan-T5-Base | HTML | 2.8K | 55.7% |
| Flan-T5-Base | HTML | 68K | 56.3% |
| Flan-T5-Base | HTML | 347K | 57.2% |
| Flan-T5-Base, ViT-B16 | HTML + Image | 2.8K | 61.1% |
| Flan-T5-Base, ViT-B16 | HTML + Image | 68K | 62.3% |
| Flan-T5-Base, ViT-B16 | HTML + Image | 347K | 66.1% |

TABLE 7

Average success rate of WebGUM with different model
sizes. For both HTML-only and multimodal models, the
performance increased as the model size increased.

| Pre-Trained Models | # of Params | Modality | Success Rate |
| --- | --- | --- | --- |
| Flan-T5-Base | 220M | HTML | 57.2% |
| Flan-T5-Large | 770M | HTML | 72.4% |
| Flan-T5-XL | 3B | HTML | 75.5% |
| Flan-T5-XXL | 11B | HTML | 79.0% |
| Flan-T5-Base, ViT-B16 | 310M | HTML + Image | 66.1% |
| Flan-T5-Large, ViT-B16 | 860M | HTML + Image | 77.4% |
| Flan-T5-XL, ViT-B16 | 3B | HTML + Image | 80.3% |

These tasks are resolved in order of the name: for instance, in the click-link_click-button_click-dialog task, for a success the agent should click the proper link, click the proper button, and click the proper dialog in that order. In the click-button_click-link task, the agent should click the proper button, and then click the proper link for success. The instructions for compositional tasks were also simply combined among original task instructions according to the order of the name. This evaluation tested the ability to transfer primitive skills to control computers to solve previously unseen tasks. Table 10 shows the per-task average success rate among the six combinations above. WebGUM solved the compositional tasks much better than baseline.

TABLE 10

Per-task average success rate on six tasks from compositional MiniWoB++.

| Compositional Task | WebN-T5[31] | WebGUM (HTML) | WebGUM (HTML + Image) |
| --- | --- | --- | --- |
| click-button__click-checkboxes | 0.26 | 0.21 | 0.27 |
| click-button__click-dialog | 0.95 | 0.72 | 0.87 |
| click-button__click-link | 0.87 | 0.51 | 0.83 |
| click-link__click-button | 0.35 | 0.95 | 0.90 |
| click-link__click-button__click-dialog | 0.08 | 0.73 | 0.73 |
| click-link__click-dialog | 0.55 | 0.95 | 0.93 |
| Ave. | 0.510 | 0.678 | 0.755 |

To construct a large-scale multimodal behavioral dataset on MiniWoB++, a public finetuned-LLM policy trained with a multi-task human demonstration dataset was used as a demonstrator. Such LLM policies were run with 10,000 episodes per task and only successful trajectories retained to maintain the quality of dataset. In addition, to collect expert demonstrations on a harder task that finetuned-LLM struggled to solve, a scripted policy for a book-flight task was created. Table 8 shows the details of this multimodal dataset, consisting of HTML, screenshots, actions, and instructions at each time step.

Fifty-six tasks were used as a benchmark, while removing some duplicated tasks (e.g. "-nodelay" tasks) from the sixty-two tasks adopted in Gur et al. During the evaluation on MiniWoB++, the time limit was disregarded due to computational constraints.

Figure 7:
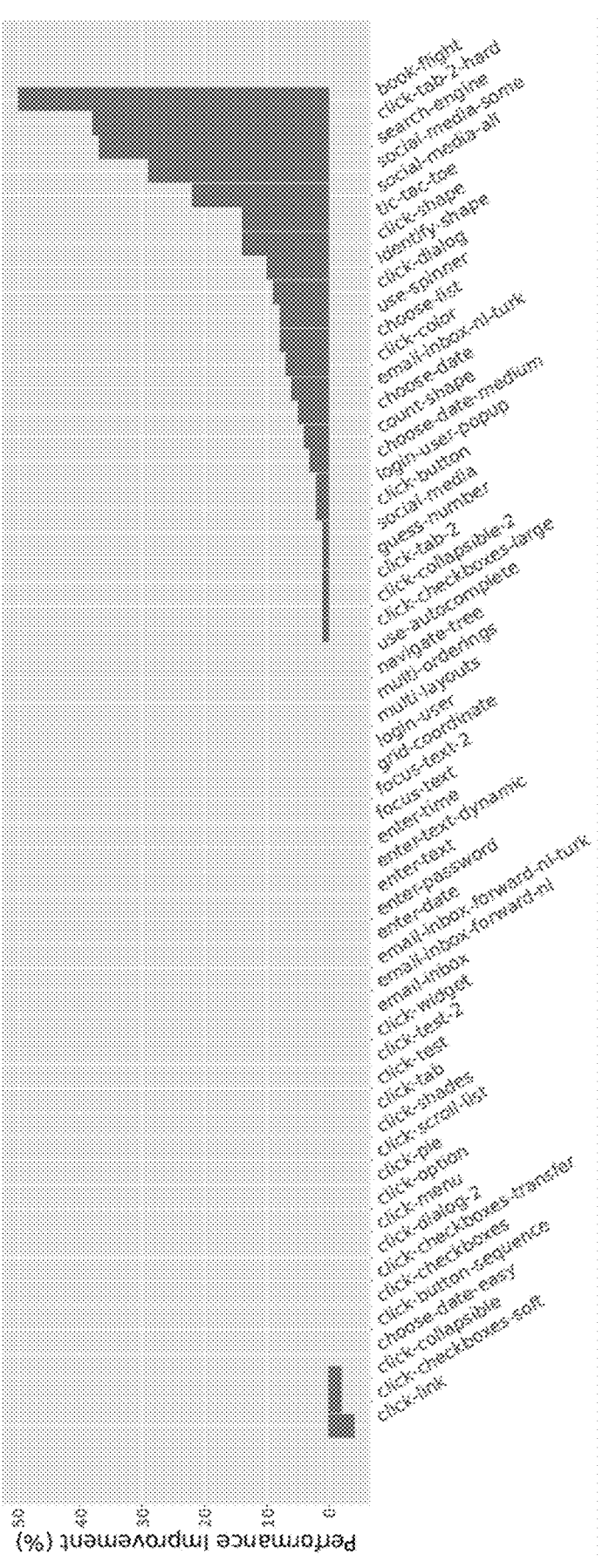
FIG. 7 depicts experimental results.
Figure 8A:
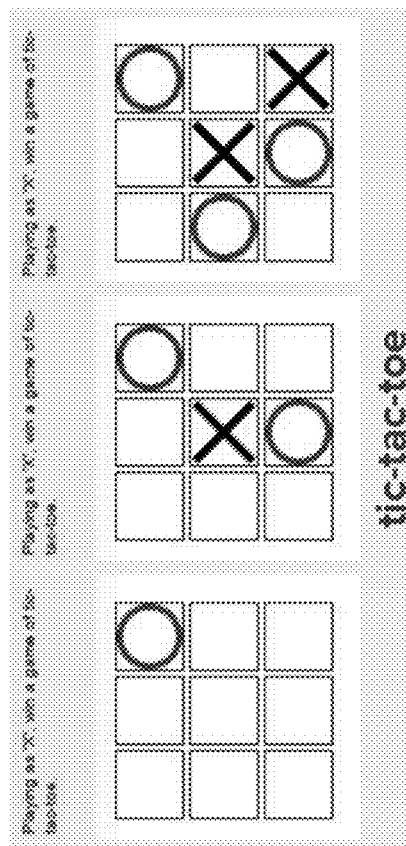
FIG. 8A depicts example experimental outputs.
Figure 8A:
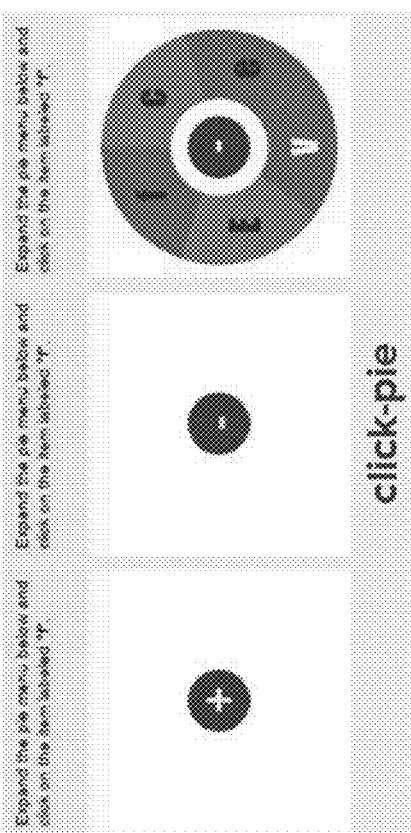
Figure 8A:
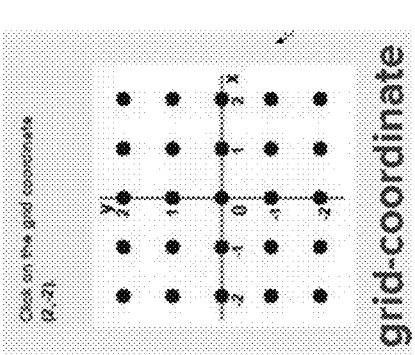

FIG. 7 presents full results of the absolute performance improvement, success rates were subtracted as: (Success Rate of WebGUM(HTML+Image))–(Success Rate of WebGUM(HTML)). The results show that WebGUM leveraged visual inputs for multi-step tasks with dynamic page transitions (e.g. book-flight or search-engine) the tasks that require global contexts of the page (e.g. tic-tac-toe or click-shape).

FIG. 7: Performance improvement by adding image modality to HTML on 56 tasks from MiniWoB++. Success rates were subtracted as: (Success Rate of WebGUM (HTML+Image))–(Success Rate of WebGUM(HTML)).

For the compositional evaluation, four click-"something" (link, button, checkboxes, dialog) tasks were selected and combinations thereof created by naively stitching two or three tasks together. Then, the following 6 combinational tasks were created:

click-button_click-checkboxes;
click-button_click-dialog;
click-button_click-link;
click-link_click-button;
click-link_click-button_click-dialog; and
click-link_click-dialog.

In addition to MiniWoB++, WebGUM was evaluated on the WebShop benchmark, another online-shopping websites simulator with a large amount of real-world product data. WebShop provides user instructions that describe the features of desired items (e.g. I need a long clip-in hair extension which is natural looking, and price lower than 20.00 dollars). The agents should then search, compare, and choose a proper product that matches the given instruction. Since WebShop requires complex multi-step reasoning, with consideration of previous contexts for comparison, this benchmark facilitates testing the ability of the models described herein (e.g., WebGUM) to accomplish decision-making tasks in depth. The performance score was evaluated as the percentage of required attributes covered by the chosen product (from 0 to 100), and if the product meets all the requirements, that episode is labeled a success.

Because WebShop does not have an API to generate the screenshot of rendered websites, WebGUM with text inputs only was evaluated. The actions were converted from raw texts (e.g. search[a long clip-in hair extension] or click [<item id>]) to dictionary-like format (e.g. {"action": "search", "ref": "a long clip-in hair extension" } or {"action": "click", "ref": "<item id>" }), as was done when evaluating against MiniWoB++, to improve the prediction accuracy. Finetuned Flan-T5-XL was used with about 1K human demonstrations, using only high-score demonstrations. The score threshold was score >50 and 840 episodes in total were used (Table 12). The model input was constructed with action history, instruction, and text observation, the same as in the MiniWoB++ experiments. The method described herein was evaluated with 500 user instructions in the test set.

Table 11 shows that WebGUM achieved 45.0% success, significantly outperforming not only simple baselines, such as supervised imitation learning (IL) and IL plus RL-finetuning (by more than 15%), but also recent prompt-based LLM agents, including ReAct (i.e. PaLM-540B with one-shot prompt and reasoning annotations). These performance levels were obtained despite WebGUM having only 3 billion parameters. IL and IL plus RL-finetuning baselines use a BART model for the search policy, and a BERT model for the click policy.

TABLE 11

Average score and success rate on the WebShop benchmark.
WebGUM based on Flan-T5-XL achieved 45.0% success, outperforming most baseline approaches including ReAct, a prompted PaLM-540B with reasoning annotations.

| Methods | Training | Model | Modality | Score | Success Rate |
|---------|----------|-------|----------|-------|--------------|
| Rule | — | — | Text | 45.6 | 9.6% |
| IL | SL | BART, BERT | Text(+Image) | 59.9 | 29.1% |
| IL + RL | SL + RL | BART, BERT | Text(+Image) | 62.4 | 28.7% |
| Act | In-context | PaLM-540B | Text | 62.3 | 30.1% |
| ReAct | In-context | PaLM-540B | Text | 66.6 | 40.0% |
| WebN-T5 | SL | T5-XL | Text | 61.0 | 29.8% |
| WebGUM | SL | Flan-T5-XL | Text | 67.5 | 45.0% |
| Human | — | — | Text + Image | 82.1 | 59.6% |

III. Example Machine Learning Models and Training Thereof

A machine learning model as described herein may include, but is not limited to: an artificial neural network (e.g., Transformers, layered models wherein each layer includes two or more sub-layers one or more of which could include artificial neural networks, convolutional neural networks, a recurrent neural network, a Bayesian network, a hidden Markov model, a Markov decision process, a logistic regression function, a support vector machine, a suitable statistical machine learning algorithm, and/or a heuristic machine learning system), a support vector machine, a regression tree, an ensemble of regression trees (also referred to as a regression forest), a decision tree, an ensemble of decision trees (also referred to as a decision forest), or some other machine learning model architecture or combination of architectures.

An artificial neural network (ANN) could be configured in a variety of ways. For example, the ANN could include two or more layers, could include units having linear, logarithmic, or otherwise-specified output functions, could include fully or otherwise-connected neurons, could include recurrent and/or feed-forward connections between neurons in different layers, could include filters or other elements to process input information and/or information passing between layers, or could be configured in some other way to facilitate the processing of input sequences, sets of embedding vectors representing input sequences, downstream vectors and/or set of vector determined by the operation of one or more layers or sublayers of a multi-layer model, and/or individual vectors (e.g., embedding vectors representing tokens of an input sequence and/or embeddings of tiles of an input image which may or may not include positional information encoding the location of such tokens relative to each other within a length of text and/or image, downstream vectors representing the processing of such embedding vectors by one or more layers or sublayers of a multi-layer model).

An ANN could include one or more filters that could be applied to the input and the outputs of such filters could then be applied to the inputs of one or more neurons of the ANN. For example, such an ANN could be or could include a convolutional neural network (CNN). Convolutional neural networks are a variety of ANNs that are configured to facilitate ANN-based classification or other processing based on images or other large-dimensional inputs whose elements are organized within two or more dimensions. The organization of the ANN along these dimensions may be related to some structure in the input structure (e.g., as relative location within the one-dimensional space of sequence of tokens can be related to similarity or relevance between tokens of the sequence).

In example embodiments, a CNN includes at least one two-dimensional (or higher-dimensional) filter that is applied to an input; the filtered input is then applied to neurons of the CNN (e.g., of a convolutional layer of the CNN). The convolution of such a filter and an input could represent the color values of a pixel or a group of pixels from the input, in embodiments where the input is an image. A set of neurons of a CNN could receive respective inputs that are determined by applying the same filter to an input. Additionally or alternatively, a set of neurons of a CNN could be associated with respective different filters and could receive respective inputs that are determined by applying the respective filter to the input. Such filters could be trained during training of the CNN or could be pre-specified. For example, such filters could represent wavelet filters, center-surround filters, biologically inspired filter kernels (e.g., from studies of animal visual processing receptive fields), or some other pre-specified filter patterns.

A CNN or other variety of ANN could include multiple convolutional layers (e.g., corresponding to respective different filters and/or features), pooling layers, rectification layers, fully connected layers, or other types of layers. Convolutional layers of a CNN represent convolution of an input image, or of some other input (e.g., of a filtered, downsampled, or otherwise-processed version of an input image), with a filter. Pooling layers of a CNN apply non-linear downsampling to higher layers of the CNN, e.g., by applying a maximum, average, L2-norm, or other pooling function to a subset of neurons, outputs, or other features of the higher layer(s) of the CNN. Rectification layers of a CNN apply a rectifying nonlinear function (e.g., a non-saturating activation function, a sigmoid function) to outputs of a higher layer. Fully connected layers of a CNN receive inputs from many or all of the neurons in one or more higher layers of the CNN. The outputs of neurons of one or more fully connected layers (e.g., a final layer of an ANN or CNN) could be used to determine information about areas of an input image (e.g., for each of the pixels of an input image) or for the image as a whole.

Neurons in a CNN can be organized according to corresponding dimensions of the input. For example, where the input is a sequence of token (a one-dimensional input, with each token representing one or more words, or fractions of words, in an input text string), neurons of the CNN (e.g., of an input layer of the CNN, of a pooling layer of the CNN) could correspond to locations in the one-dimensional input string/sequence. Connections between neurons and/or filters in different layers of the CNN could be related to such locations.

Figure 9:
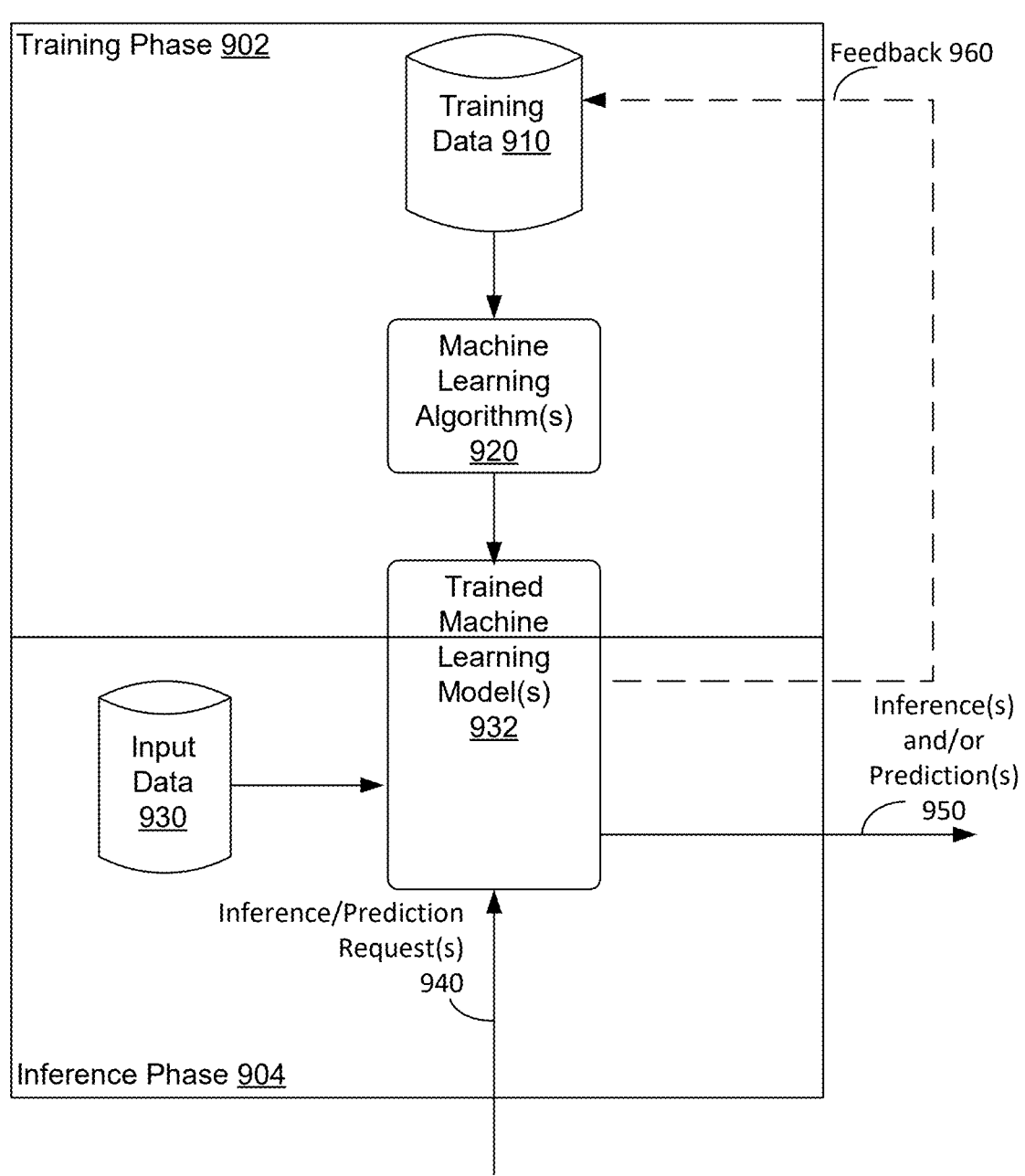
FIG. 9 is a diagram illustrating training and inference phases of a machine learning model, in accordance with example embodiments.

FIG. 9 shows diagram 900 illustrating a training phase 902 and an inference phase 904 of trained machine learning model(s) 932, in accordance with example embodiments. Some machine learning techniques involve training one or more machine learning algorithms, on an input set of training data to recognize patterns in the training data and provide output inferences and/or predictions about (patterns in the) training data. Such output could take the form of filtered or otherwise modified versions of the input, e.g., an input sequence that represents text in a source language could be modified by the machine learning model into (i) an output sequence that represents text in a target language that has similar meaning or semantic content as the input sequence and/or (ii) an output set of embedding vectors that represent, in a semantic embedding space, the meaning or semantic content of the input sequence. The resulting trained machine learning algorithm can be termed as a trained machine learning model. For example, FIG. 9 shows training phase 902 where one or more machine learning algorithms 920 are being trained on training data 910 to become trained machine learning model 932. Then, during inference phase 904, trained machine learning model 932 can receive input data 930 and one or more inference/prediction requests 940 (perhaps as part of input data 930) and responsively provide as an output one or more inferences and/or predictions 950.

As such, trained machine learning model(s) 932 can include one or more models of one or more machine learning algorithms 920. Machine learning algorithm(s) 920 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system), a Transformer, a support vector machine, a regression tree, an ensemble of regression trees (also referred to as a regression forest), a decision tree, an ensemble of decision trees (also referred to as a decision forest), or some other machine learning model architecture or combination of architectures. For example, the trained machine learning model(s) 932 could include a plurality of artificial neural networks and other elements related to such networks (e.g., mixing or weighting matrices, attention heads or other attentional mechanisms, sums, products, feedforward connections) arranged according to the multi-layer and sublayer architecture of a Transformer or similar model architecture designed to process input sequences. Machine learning algorithm(s) 920 may be supervised or unsupervised, and may implement any suitable combination of online and offline learning.

In some examples, machine learning algorithm(s) 920 and/or trained machine learning model(s) 932 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 920 and/or trained machine learning model(s) 932. In some examples, trained machine learning model(s) 932 can be trained, reside and execute to provide inferences on a particular computing device, and/or otherwise can make inferences for the particular computing device.

During training phase 902, machine learning algorithm(s) 920 can be trained by providing at least training data 910 as training input using unsupervised, supervised, semi-supervised, and/or reinforcement learning techniques. Unsupervised learning involves providing a portion (or all) of training data 910 to machine learning algorithm(s) 920 and machine learning algorithm(s) 920 determining one or more output inferences based on the provided portion (or all) of training data 910. Supervised learning involves providing a portion of training data 910 to machine learning algorithm(s) 920, with machine learning algorithm(s) 920 determining one or more output inferences based on the provided portion of training data 910, and the output inference(s) are either accepted or corrected based on correct results associated with training data 910. In some examples, supervised learning of machine learning algorithm(s) 920 can be governed by a set of rules and/or a set of labels for the training input, and the set of rules and/or set of labels may be used to correct inferences of machine learning algorithm(s) 920.

Semi-supervised learning involves having correct results for part, but not all, of training data 910. During semi-supervised learning, supervised learning is used for a portion of training data 910 having correct results, and unsupervised learning is used for a portion of training data 910 not having correct results. Reinforcement learning involves machine learning algorithm(s) 920 receiving a reward signal regarding a prior inference, where the reward signal can be a numerical value. During reinforcement learning, machine learning algorithm(s) 920 can output an inference and receive a reward signal in response, where machine learning algorithm(s) 920 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 920 and/or trained machine learning model(s) 932 can be trained using other machine learning techniques, including but not limited to, incremental learning and curriculum learning.

In some examples, machine learning algorithm(s) 920 and/or trained machine learning model(s) 932 can use transfer learning techniques. For example, transfer learning techniques can involve trained machine learning model(s) 932 being pre-trained on one set of data and additionally trained using training data 910. More particularly, machine learning algorithm(s) 920 can be pre-trained on data from one or more computing devices and a resulting trained machine learning model provided to computing device CD1, where CD1 is intended to execute the trained machine learning model during inference phase 904. Then, during training phase 902, the pre-trained machine learning model can be additionally trained using training data 910, where training data 910 can be derived from kernel and non-kernel data of computing device CD1. This further training of the machine learning algorithm(s) 920 and/or the pre-trained machine learning model using training data 910 of CD1's data can be performed using either supervised or unsupervised learning. Once machine learning algorithm(s) 920 and/or the pre-trained machine learning model has been trained on at least training data 910, training phase 902 can be completed. The trained resulting machine learning model can be utilized as at least one of trained machine learning model(s) 932.

In particular, once training phase 902 has been completed, trained machine learning model(s) 932 can be provided to a computing device, if not already on the computing device. Inference phase 904 can begin after trained machine learning model(s) 932 are provided to computing device CD1.

During inference phase 904, trained machine learning model(s) 932 can receive input data 930 and generate and output one or more corresponding inferences and/or predictions 950 about input data 930. As such, input data 930 can be used as an input to trained machine learning model(s) 932 for providing corresponding inference(s) and/or prediction(s) 950 to kernel components and non-kernel components. For example, trained machine learning model(s) 932 can generate inference(s) and/or prediction(s) 950 in response to one or more inference/prediction requests 940. In some examples, trained machine learning model(s) 932 can be executed by a portion of other software. For example, trained machine learning model(s) 932 can be executed by an inference or prediction daemon to be readily available to provide inferences and/or predictions upon request. Input data 930 can include data from computing device CD1 executing trained machine learning model(s) 932 and/or input data from one or more computing devices other than CD1.

Input data 930 can include a collection of text strings provided by one or more sources. The collection of text strings can include natural language, artificially generated language, text from books, texts from online forums or chats, texts from emails, text applied to describe associated image(s), and/or other text. Other types of input data are possible as well.

Inference(s) and/or prediction(s) 950 can include output text strings, output token sequences, output sets of embedding vectors, numerical values, and/or other output data produced by trained machine learning model(s) 932 operating on input data 930 (and training data 910). In some examples, trained machine learning model(s) 932 can use output inference(s) and/or prediction(s) 950 as input feedback 960. Trained machine learning model(s) 932 can also rely on past inferences as inputs for generating new inferences.

IV. Example Systems

Figure 10:
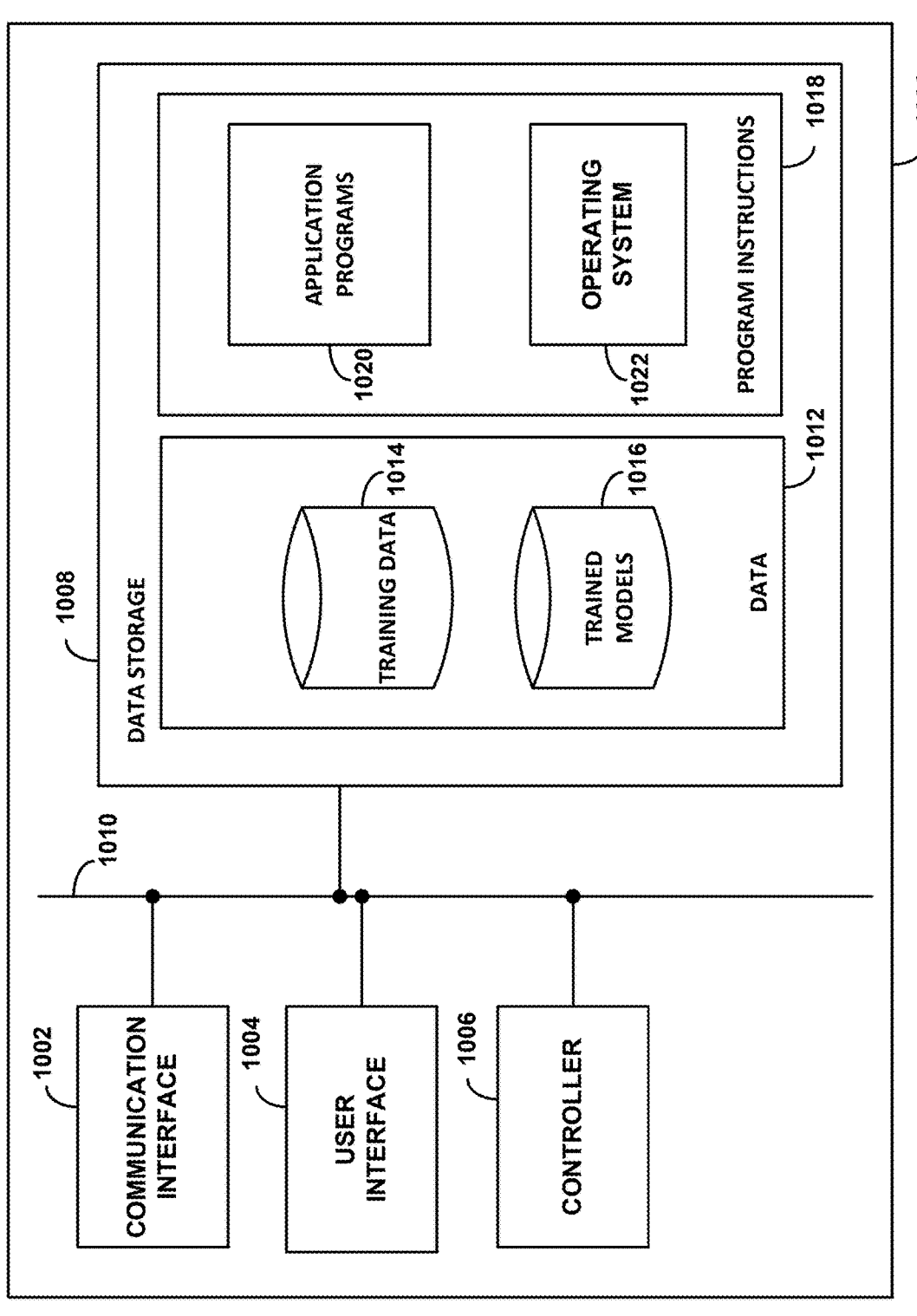
FIG. 10 is a simplified block diagram showing some of the components of an example computing system.

FIG. 10 illustrates an example computing device 1000 that may be used to implement the methods described herein. By way of example and without limitation, computing device 1000 may be a cellular mobile telephone (e.g., a smartphone), a computer (such as a desktop, notebook, tablet, or handheld computer, a server), elements of a cloud computing system, an autonomous vehicle, or some other type of device. It should be understood that computing device 1000 may represent a physical computing device such as a server, a particular physical hardware platform on which a machine learning application operates in software, or other combinations of hardware and software that are configured to carry out machine learning functions as described herein.

As shown in FIG. 10, computing device 1000 may include a communication interface 1002, a user interface 1004, a controller 1006 (which may include one or more processors), and data storage 1008, all of which may be communicatively linked together by a system bus, network, or other connection mechanism 1010.

Communication interface 1002 may function to allow computing device 1000 to communicate, using analog or digital modulation of electric, magnetic, electromagnetic, optical, or other signals, with other devices, access networks, and/or transport networks. Thus, communication interface 1002 may facilitate circuit-switched and/or packet-switched communication, such as plain old telephone service (POTS) communication and/or Internet protocol (IP) or other packetized communication. For instance, communication interface 1002 may include a chipset and antenna arranged for wireless communication with a radio access network or an access point. Also, communication interface 1002 may take the form of or include a wireline interface, such as an Ethernet, Universal Serial Bus (USB), or High-Definition Multimedia Interface (HDMI) port. Communication interface 1002 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 1002. Furthermore, communication interface 1002 may comprise multiple physical communication interfaces (e.g., a WiFi interface, a BLUETOOTH® interface, and a wide-area wireless interface).

In some embodiments, communication interface 1002 may function to allow computing device 1000 to communicate with other devices, remote servers, access networks, and/or transport networks. For example, the communication interface 1002 may function to access one or more machine learning models and/or outputs thereof via communication with a remote server or other remote device or system in order to allow the computing device 1000 to use the machine learning model(s) to generate outputs (e.g., commands to interact with remote systems via the internet, e.g., as segments of HTML to implements the commands) based on input data. For example, the computing system 1000 could be an inference server and the remote system could be a smartphone that generated an image (e.g., one or more images rendered of a website) and a textual input (e.g., text representing HTML of the website, text representing a user command, text representing previous model outputs) to be applied to a machine learning model in order to determine subsequent commands to accomplish a user's request(s), e.g., a textual output representing whether to click an element of the website or to input text into the elements of the website, the identity of the element, and optionally the text to be input.

User interface 1004 may function to allow computing device 1000 to interact with a user, for example to receive input from and/or to provide output to the user. Thus, user interface 1004 may include input components such as a keypad, keyboard, touch-sensitive or presence-sensitive panel, computer mouse, trackball, joystick, microphone, and so on. User interface 1004 may also include one or more output components such as a display screen that, for example, may be combined with a presence-sensitive panel. The display screen may be based on CRT, LCD, and/or LED technologies, or other technologies now known or later developed. User interface 1004 may also be configured to generate audible output(s), via a speaker, speaker jack, audio output port, audio output device, earphones, and/or other similar devices.

Controller 1006 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). In some instances, special purpose processors may be capable of image processing (e.g., application of CNN kernels or other filters to images via, e.g., convolution), machine learning model training, execution, and/or inference, among other applications or functions. Data storage 1008 may include one or more volatile and/or non-volatile storage components, such as magnetic, optical, flash, or organic storage, and may be integrated in whole or in part with controller 1006. For example, a portion of the data storage 1008 may be implemented as cache or other on-chip memory of a graphics processing unit or tensor processing unit integrated circuit and/or as RAM or some other variety of storage that is collocated with a GPU or TPU, e.g., on a graphics card, tensor acceleration card, or other semi-discrete subsystem of the overall system 1000. Such storage could be used to store parameters that define a machine learning model (e.g., weights or other parameters of units of a multi-layer neural network or other multi-unit machine learning model). Data storage 1008 may include removable and/or non-removable components.

Controller 1006 may be capable of executing program instructions 1018 (e.g., compiled or non-compiled program logic and/or machine code) stored in data storage 1008 to carry out the various functions described herein. Therefore, data storage 1008 may include a non-transitory computer-readable medium, having stored thereon program instructions that, upon execution by computing device 1000, cause computing device 1000 to carry out any of the methods, processes, or functions disclosed in this specification and/or the accompanying drawings. The execution of program instructions 1018 by controller 1006 may result in controller 1006 using data 1012.

By way of example, program instructions 1018 may include an operating system 1022 (e.g., an operating system kernel, device driver(s), and/or other modules) and one or more application programs 1020 (e.g., functions for executing trained machine learning models and/or training such models) installed on computing device 1000. Data 1012 may include stored training data 1014 (e.g., images and text associated with the images that represent HTML, user requests, prior model outputs, or other information that represents a number of example scenarios of an agent navigating the web to accomplish the stated user requests) that could be used to train (e.g., to fine-tune) one or more machine learning models 1016.

Application programs 1020 may communicate with operating system 1022 through one or more application programming interfaces (APIs). These APIs may facilitate, for instance, application programs 1020 reading and/or writing a trained machine learning model 1016, transmitting or receiving information via communication interface 1002, receiving and/or displaying information on user interface 1004, and so on.

Application programs 1020 may take the form of "apps" that could be downloadable to computing device 1000 through one or more online application stores or application markets (via, e.g., the communication interface 1002). However, application programs can also be installed on computing device 1000 in other ways, such as via a web browser or through a physical interface (e.g., a USB port) of the computing device 1000.

V. Example Methods

FIG. 11 is a flowchart of a method 1100 as described herein. The method 1100 includes applying a first image of a website to a first machine learning model to generate a first set of visual tokens that represents the contents of the first image (1110). The method 1100 additionally includes transforming a first textual input to generate a first set of textual tokens that represents the contents of the first textual input, wherein the first textual input includes at least a first portion of a code defining the website and a command to perform a task using the website (1120). The method 1100 additionally includes applying the first set of visual tokens and the first set of textual tokens to a second machine learning model to generate a first intermediate output, wherein the second machine learning model comprises an encoder (1130). The method 1100 additionally includes applying the first intermediate output to a third machine learning model to generate a first command output, wherein the first command output represents an action to take relative to the code defining the website to effect the task, and wherein the third machine learning model comprises a decoder (1140). The method 1100 could include additional or alternative steps or features.

FIG. 12 is a flowchart of a method 1200 as described herein. The method 1200 includes obtaining a training dataset that includes a plurality of sequences of actions, wherein each sequence of actions of the training dataset corresponds to a respective command to perform a task using a respective website, and wherein each action of a particular sequence of the plurality of sequences of actions is associated with a respective image of the website for the particular sequence prior to taking the action (1210). The method 1200 additionally includes using the training dataset to train first, second, and third machine learning models (1220) such that: (i) the first machine learning model is trained to generate, from an image of a website, a first set of visual tokens that represents the contents of the image; (ii) the second machine learning model is trained to generate, from the first set of visual tokens and a first set of textual tokens, a first intermediate output, wherein the first set of textual tokens represents the contents of a textual input that includes at least a first portion of a code defining the website and a command to perform a task using the website, and wherein the second machine learning model comprises an encoder; and (iii) the third machine learning model is trained to generate, from the intermediate output, a first command output that represents an action to take relative to the code defining the website to effect the task, wherein the third machine learning model comprises a decoder, wherein each sequence of actions of the training dataset corresponding to a respective command to perform a task using a respective website, and wherein each action of a particular sequence is associated with a respective image of the website for the particular sequence prior to taking the action. The method 1200 could include additional or alternative steps or features.

VI. Conclusion

The above detailed description describes various features and functions of the disclosed systems, devices, and methods with reference to the accompanying figures. In the figures, similar symbols typically identify similar components, unless the context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A computer-implemented method comprising:
   applying a first image of a website to a first machine learning model to generate a first set of visual tokens that represents the contents of the first image;
   transforming a first textual input to generate a first set of textual tokens that represents the contents of the first textual input, wherein the first textual input includes at least a first portion of a code defining the website and a command to perform a task using the website;
   applying the first set of visual tokens and the first set of textual tokens to a second machine learning model to generate a first intermediate output, wherein the second machine learning model comprises an encoder; and
   applying the first intermediate output to a third machine learning model to generate a first command output, wherein the first command output represents an action to take relative to the code defining the website to effect the task, and wherein the third machine learning model comprises a decoder.

2. The computer-implemented method of claim 1, wherein the first textual input additionally comprises a previous command output of the third machine learning model, wherein a command based on the first command output was transmitted to a server hosting the website to result in the generation of the first image of the website and the first portion of code defining the website.

3. The computer-implemented method of claim 1, further comprising:
   receiving, from a server hosting the website, the first portion of the code;
   generating the first image of the website based on at least the first portion of the code; and
   transmitting, to the server, a command based on the first command output.

4. The computer-implemented method of claim 3, wherein the first command output specifies a target object within the first portion of the code and an action to take toward the target object.

5. The computer-implemented method of claim 4, wherein the first command output specifies that the action to take toward the target object is one of clicking the target object or inputting text to the target object.

6. The computer-implemented method of claim 3, further comprising, subsequent to transmitting the command based on the first command output transmitting to the server:
   receiving, from the server, a second portion of a code defining the website;
   generating a second image of the website based on at least the second portion of the code;
   applying the second image of the website to the first machine learning model to generate a second set of visual tokens that represents the contents of the second image;
   transforming a second textual input to generate a second set of textual tokens that represents the contents of the second textual input, wherein the second textual input includes at least the first portion of the code, the command to perform the task using the website, the second portion of the code, and the first command output;
   apply the first set of visual tokens, the second set of visual tokens, and the second set of textual tokens to the second machine learning model to generate a second intermediate output;
   applying the second intermediate output to the third machine learning model to generate a second command output, wherein the second command output represents an action to take relative to the code defining the website to effect the task; and
   transmitting, to the server, a command based on the second command output.

7. The computer-implemented method of claim 1, wherein the first textual input additionally includes at least one past command output generated by the third machine learning model prior to generating the first command output.

8. The computer-implemented method of claim 1, wherein the first, second, and third machine learning models were trained using a training dataset that included a plurality of sequences of actions, with each sequence of actions corresponding to a respective command to perform a task using a respective website, wherein each action of a particular sequence is associated with a respective image of the website for the particular sequence prior to taking the action.

9. The computer-implemented method of claim 8, wherein the second machine learning model and third machine learning model were pre-trained as an instruction-finetuned language model prior to being trained using the training dataset.

10. The computer-implemented method of claim 1, wherein the first machine learning model comprises a vision transformer, and wherein the second machine learning model and third machine learning model were at least partially pre-trained as an instruction-finetuned language model.

11. A non-transitory computer readable medium having stored thereon program instructions executable by at least one processor to cause the at least one processor to perform a method comprising:

applying a first image of a website to a first machine learning model to generate a first set of visual tokens that represents the contents of the first image;

transforming a first textual input to generate a first set of textual tokens that represents the contents of the first textual input, wherein the first textual input includes at least a first portion of a code defining the website and a command to perform a task using the website;

applying the first set of visual tokens and the first set of textual tokens to a second machine learning model to generate a first intermediate output, wherein the second machine learning model comprises an encoder; and applying the first intermediate output to a third machine learning model to generate a first command output, wherein the first command output represents an action to take relative to the code defining the website to effect the task, and wherein the third machine learning model comprises a decoder.

12. The non-transitory computer readable medium of claim 11, wherein the first textual input additionally comprises a previous command output of the third machine learning model, wherein a command based on the first command output was transmitted to a server hosting the website to result in the generation of the first image of the website and the first portion of code defining the website.

13. The non-transitory computer readable medium of claim 11, wherein the method further comprises:

receiving, from a server hosting the website, the first portion of the code;

generating the first image of the website based on at least the first portion of the code; and transmitting, to the server, a command based on the first command output.

14. The non-transitory computer readable medium of claim 13, wherein the first command output specifies a target object within the first portion of the code and an action to take toward the target object.

15. The non-transitory computer readable medium of claim 14, wherein the first command output specifies that the action to take toward the target object is one of clicking the target object or inputting text to the target object.

16. The non-transitory computer readable medium of claim 13, wherein the method further comprises, subsequent to transmitting the command based on the first command output transmitting to the server:

receiving, from the server, a second portion of a code defining the website;

generating a second image of the website based on at least the second portion of the code;

applying the second image of the website to the first machine learning model to generate a second set of visual tokens that represents the contents of the second image;

transforming a second textual input to generate a second set of textual tokens that represents the contents of the second textual input, wherein the second textual input includes at least the first portion of the code, the command to perform the task using the website, the second portion of the code, and the first command output;

apply the first set of visual tokens, the second set of visual tokens, and the second set of textual tokens to the second machine learning model to generate a second intermediate output;

applying the second intermediate output to the third machine learning model to generate a second command output, wherein the second command output represents an action to take relative to the code defining the website to effect the task; and transmitting, to the server, a command based on the second command output.

17. The non-transitory computer readable medium of claim 11, wherein the first textual input additionally includes at least one past command output generated by the third machine learning model prior to generating the first command output.

18. The non-transitory computer readable medium of claim 11, wherein the first machine learning model comprises a vision transformer, and wherein the second machine learning model and third machine learning model were at least partially pre-trained as an instruction-finetuned language model.

19. A computer-implemented method comprising:

obtaining a training dataset that includes a plurality of sequences of actions, wherein each sequence of actions of the training dataset corresponds to a respective command to perform a task using a respective website, and wherein each action of a particular sequence of the plurality of sequences of actions is associated with a respective image of the website for the particular sequence prior to taking the action; and using the training dataset to train first, second, and third machine learning models such that:

the first machine learning model is trained to generate, from an image of a website, a first set of visual tokens that represents the contents of the image;

the second machine learning model is trained to generate, from the first set of visual tokens and a first set of textual tokens, a first intermediate output, wherein the first set of textual tokens represents the contents of a textual input that includes at least a first portion of a code defining the website and a command to perform a task using the website, and wherein the second machine learning model comprises an encoder; and the third machine learning model is trained to generate, from the intermediate output, a first command output that represents an action to take relative to the code defining the website to effect the task, wherein the third machine learning model comprises a decoder.

20. The computer-implemented method of claim 19, wherein the second machine learning model and third machine learning model were pre-trained as an instruction-finetuned language model prior to being trained using the training dataset.

*     *     *     *     *